United States Patent [19]
Taylor et al.

[11] Patent Number: 5,754,306
[45] Date of Patent: May 19, 1998

[54] SYSTEM AND METHOD FOR A COMMUNICATION SYSTEM

[75] Inventors: David R. P. Taylor, Stanford; Lawrence A. Lynch-Freshner, Boulder Creek; Eric W. McKinlay, Monte Vista; Stephen P. Pacheco, San Francisco; Dinesh K. Goyal, San Jose, all of Calif.

[73] Assignee: Hewlett-Packard Company, Palo Alto, Calif.

[21] Appl. No.: 523,565

[22] Filed: Sep. 5, 1995

Related U.S. Application Data

[63] Continuation of Ser. No. 77,402, Jun. 15, 1993, abandoned.
[51] Int. Cl.$^6$ ............................................. H04N 1/00
[52] U.S. Cl. .................. 358/400; 358/402; 358/407; 358/442; 395/200.06; 395/200.07
[58] Field of Search .......................... 358/400, 402, 358/403, 405, 407, 442; 379/88, 89, 67, 201, 142, 100; 395/153, 161, 200.06, 200.07, 200.02, 200.04, 200.1, 200.11, 200.12

[56] References Cited

U.S. PATENT DOCUMENTS

| | | | |
|---|---|---|---|
| 4,790,003 | 12/1988 | Kepley et al. | 379/88 |
| 4,972,461 | 11/1990 | Brown et al. | 379/67 |
| 5,072,309 | 12/1991 | Brown | 358/403 |
| 5,146,348 | 9/1992 | Kaneyama | 358/407 |
| 5,291,302 | 3/1994 | Gordon et al. | 358/400 |

FOREIGN PATENT DOCUMENTS

| 239647 A | 2/1990 | Japan | 358/402 |
|---|---|---|---|

*Primary Examiner*—Thomas D. Lee
*Assistant Examiner*—Jerome Grant, II

[57] ABSTRACT

A method and a structure for providing electronic mail, facsimile transmission and file transfer maintain a data base in which the communication parameters of a local computer are maintained separately from the communication parameters of a remote computer which communicates the local computer. The data base includes an electronic address book in which a method and a structure are provided for specifying person, group, computer, calling card and service data. The person type data includes specification of a preference for data, or facsimile transmission. Service information are efficiently added because of modularly designed application programming interface. A method and a structure are also provided to allow synchronization between files residing on different computers.

8 Claims, 27 Drawing Sheets

Eric McClapton

Middle Manager
Howling Pickers
9999 Ark Street
Cloudyville, CA 94044

Send message via EMail
Business

Work Phone: (408) 720-3000
Home Phone: (408) 476-5555
Beeper: (408) 720-3001
Work Fax: (408) 720-3002
Home Fax: (408) 476-5551
EMail:   AT&T: !EMCclapton
         MCI:EricMcC Comments:

SYSTEM AND METHOD FOR A COMMUNICATION SYSTEM

CROSS REFERENCE TO RELATED APPLICATION

This is a continuation of application Ser. No. 08/077,402 filed on Jun. 15, 1993, now abandoned.

BACKGROUND OF THE INVENTION

1. Field of the Invention

The present invention relates to the automation of electronic communication systems; and in particular, relates to an integrated system for electronic mail, facsimile transmission, terminal emulation and file synchronization among distributed computers.

2. Discussion of the Related Art

In addition to the telephone, electronic mail and facsimile transmission ("fax") have become indispensable communication tools in the information age. File transfers between computers are also frequently invoked communication functions. File transfers traditionally occur when information is shared among different computer users. More recently, as more users have multiple computers which are used, for example, at the work place, at home and during business travel, file transfers also occur when the same user maintains the same file in multiple machines. Further, portable computers have now made it possible for a computer user to send and receive electronic mail, a file or a fax at any time and anywhere. The frequency at which electronic mail, fax and file transfers occur has render manual management of each of these communication functions increasingly burdensome. Thus, an integrated system capable of both performing these communication tasks with minimal user intervention, and maintaining the necessary information for accomplishing each function is highly desired.

In the prior art, systems for generating and receiving electronic mail have at least two major weaknesses. First, these systems are incomplete. For example, facsimile transmission and electronic mail are not seen as satisfying the same communication need, but rather as two distinctly different applications. Consequently, the products available today typically address only one or two aspects of communications. For example, the prior art provides a program for sending and receiving facsimile transmission, and a program for providing both facsimile transmission and terminal emulation. No product to date provides, under a single user interface, and in a uniform manner, the ability to send and receive fax, file transfer, terminal emulation, and electronic mail.

The second weakness of prior art communication programs results from the designers' of such programs seeing communication as a function distinct from other functions carried out in the computer, and not as a supporting function to such other functions of the computer. For example, to send an electronic mail message today, the electronic mail application program would provide its own text processor for composing the message. This electronic mail application program may not necessarily be compatible with the other application programs the computer user uses, duplicates the functions performed by these other application programs, and demands both valuable memory space and screen "real estate."

Suitable management of communication data is also lacking in prior art communications products. For example, programs in the prior art do not automatically provide a different dialing sequence when a normally local call becomes a long distance call, or requires an access prefix to a private telephone exchange (PBX), such as when the computer user is away from his usual location during business travel or at a different office. In these situations, the user of the prior art program is required to manually edit the configuration, or even individual telephone numbers, stored in the data base of these programs.

Further, electronic address books of the prior art, such as those found in organizer programs, are generally suited only for maintaining databases designed for memorializing personal and business contacts. These programs, however, are not designed for creating an electronic communication environment. Specifically, electronic address books suffer at least two major weaknesses.

First, the type of information typically stored in such programs are insufficient for use in electronic communications. In general, these address book programs are not designed to handle electronic mail addresses, and usually provide little support for maintaining multiple fax and voice phone numbers. For example, none of these programs allows the user to specify a given recipient's preferred mode or method of receiving communication, e.g. facsimiles or electronic mail, so that an automatic procedure which sends a message to the recipient using the preferred mode or method of communication cannot be designed using databases of such programs.

Second, address book programs are structured to store information about individuals. Such programs do not provide support in maintaining information about other entities which may also be sources or destinations of communication. These entities, which include groups of people, bulletin board services, mainframe computers and desktop personal computers, all have attributes of communication different from such attributes of an individual. Thus, an environment for supporting electronic communication involving these entities cannot be created within the framework of these programs. Other deficiencies of prior art address book programs also include the absence of a flexible way to specify a communication medium, or to support telephone calling card usage, often necessary when the computer user is a traveller.

As to file transfers, prior art remote file transfer utilities are deficient in several areas. Firstly, these programs lack "user-friendliness." Typical prior art file transfer utilities are difficult to use. Often, to be able to properly set up these programs, the user is required to have detailed knowledge of data communications, such as the configuration of a modem. Further, these prior art file transfer programs do not support file management operations (e.g. marking a file for deletion, or updating a file when a new version of the file becomes available) when the communicating computers are not connected. These programs examine and operate on remote files only when the local and remote computers are connected. Thus, in these programs, file management operations are often manually performed in an interactive mode when the communicating computers are connected. Consequently, as such functions are often accomplished over a long distance telephone connection, substantial expense can be incurred.

Another deficiency in prior art file transfer utilities is the lack of support for file synchronization. The prior art file transfer utilities rest upon the human user the responsibility of remembering files or directories that need to be kept synchronized among the computers in which versions of these files or directories reside. While some products provide some support for performing such synchronization manually, none of the prior art file transfer utilities supports persistent synchronization, i.e. automatic resynchronization of such files upon connection of the computers.

Finally, to add a new communication service, prior art software products generally require a complete update of many or all system components. Installing a new service would therefore require substantial cost and significant disruption of service due to the technical complexity of configuring and testing these software products.

SUMMARY OF THE INVENTION

In accordance with the present invention, a method and a structure provide an electronic address book which allows information to be efficiently sent to users of both electronic mail and facsimile transmission. In one embodiment of the present invention, a data base stores in a local computer information about a number of recipients, where each recipient is represented by a record holding (i) a telephone number at which the recipient receives facsimile transmissions; (ii) an electronic mail address at which the recipient receives electronic mail messages; and (iii) data elements indicating whether the recipient prefers to receive the communication in the form of electronic messages, facsimile transmissions or both.

In accordance with another aspects of the present invention, a structure and a method are provided to automatically generate correct dialing sequences, for use in sending electronic mail messages or facsimile, according to the physical location of the dialer. This aspect of the present invention is particular useful for users of portable computers who travels widely and frequently. In one embodiment, a data base stores a number of records each corresponding to a recipient of the information to sent by electronic messages or facsimile, each record specifying (i) the area or country code portion of said recipient's telephone number, and (ii) the local portion of said recipient's telephone number. Separate from the recipients' communication information, the data base stores connection information in a "Connection Manager" program. Such connection information includes (i) an access code to a long distance carrier, for use when the computer is in an out-of-state or out-of-the-country location and (ii) an access code to an outside line, for use when the computer is in a frequented location, such as the home base of the travelling user. Such access code to an outside line can-be zero or more digits long, to accommodate, for example, access to a PBX. The present invention thus provides an automatic method for assembling the correct dialing sequence based on the location of the computer as indicated by the user. In addition, the data base also includes authorization information about the user's telephone credit card, which can also be automatically incorporated in the dialing sequence.

In accordance with another aspect of the present invention, a convenient method is provided for integrating into a communication package an automatic interface to an electronic mail service provider. The convenient method allows integrating the electronic service provider in an incremental manner, i.e. other components of the software package are unaffected by the integration. Consequently, additional service provider can be included without having to reinstall the other components of the communication package.

In one embodiment, the interface provides a method for retrieving from the data base an address template specifying data fields of an electronic mail address suitable for use with the electronic mail service provider. A second method receives (i) a distribution list specifying a number of recipients; and (ii) a message to be sent as electronic mail by the mail service provider. This second method then, for each recipient in the distribution list, retrieves from the data base values of the relevant data fields and uses these values to compose, according to the format specified in an address template, an electronic mail address suitable for use with the mail service provider. The message and the composed electronic mail address are then combined to form a package of a format acceptable for processing by the electronic mail provider.

In that embodiment, several methods are provided for receiving a package from the electronic mail provider. One method extracts the message from the package, another method extracts the distribution list, and a third method extracts any file attachments.

In accordance with another aspect of the present invention, a system and a method are provided for file synchronization between a local computer system and a remote computer system. In one embodiment, a communication link can be provided on demand between the local computer system and the remote computer system. In each computer system is kept a synchronization file which contains the list of files or directories to be synchronized. The synchronization file can be modified by each machine, even during a period of the time when no physical communication link exists between the local computer and the remote computer. In addition, each computer keeps a snapshot of its own file system and a snapshot of the other computer system's file system. These snapshots are taken when the local and remote computers are last physically connected. During the period when no physical connection exists between the computers, each computer can continue to modify both its own files and directories, as well as files and directories of the other computer system. When modifications are made to the other file system, while no physical communication link is in existence, the intended operations are queued. All changes to files or directories marked for synchronization, whether local or remote, are logged in each machine in the form of "delta files", which store information of the actual or intended changes. At the next physical connection of the computer systems, the remote computer system sends to the local computer system its delta files, which are then resolved in the local computer system against the local computer system's delta files. The changes resulting from resolving the delta files are the changes necessary, in each file system, to synchronize the files marked for synchronization in the synchronization file. Files are then exchanged to perform the synchronization. The resolved delta files are used to update both the snapshot files in the local computer system and the snapshot files in the remote computer system.

The file synchronization features are particular useful for users who use multiple computer systems, such as a user who uses a personal computer on a local area network at her home office, and works with a note book computer during her business travels.

BRIEF DESCRIPTION OF THE DRAWINGS

FIG. 17 shows a dialog box 1900 of the Connect Manager component in an embodiment of the present invention.

FIG. 18 shows a dialog box 1950 of the Connect Manager component, which is invoked to receive input configuration information regarding the calling location, in accordance with the present invention.

FIGS. 23a–23e shows the events under control of the File Manager of the present invention during a connection between a local computer and a remote computer.

DETAILED DESCRIPTION OF THE PREFERRED EMBODIMENTS

Figure 1:
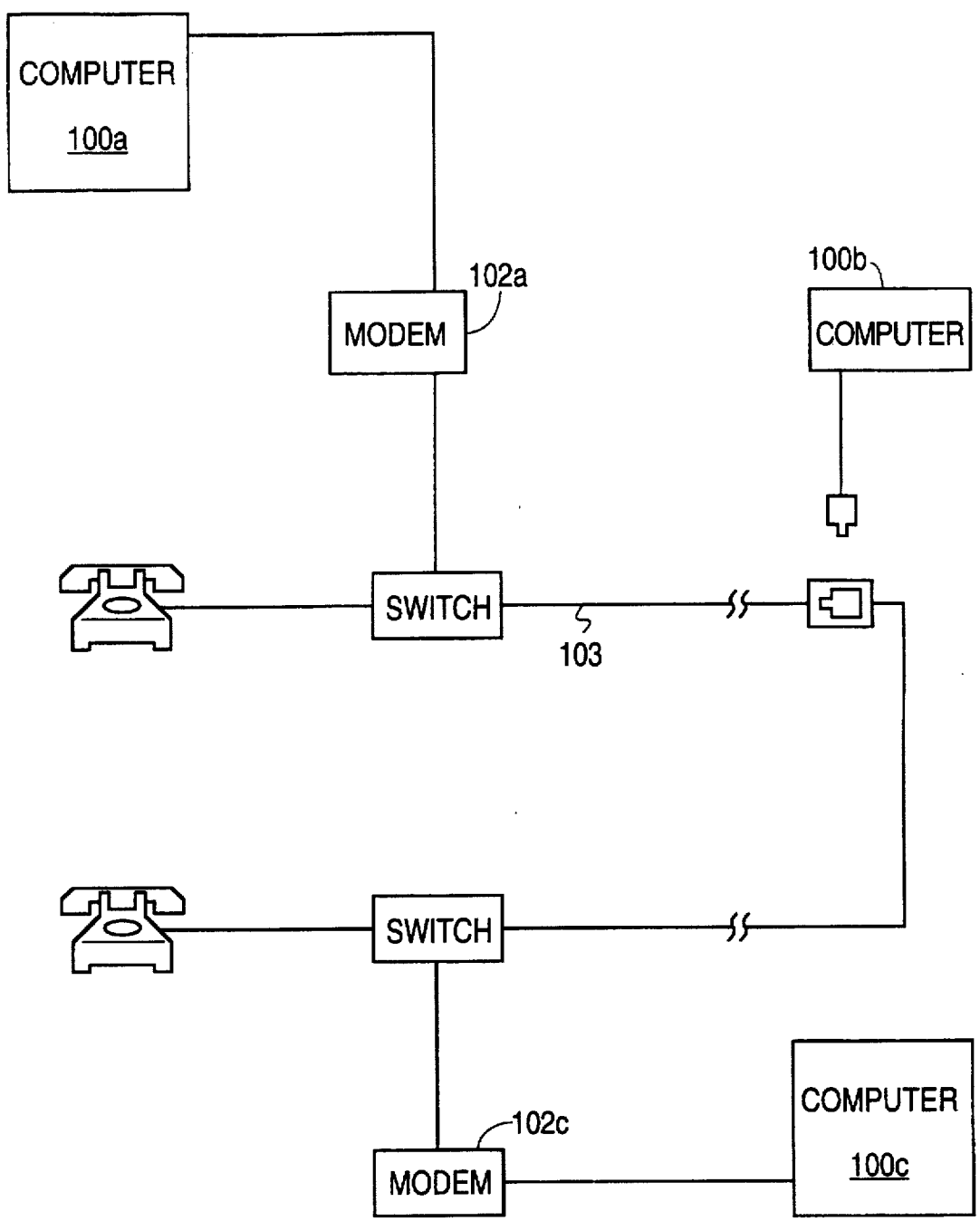
FIG. 1 shows is a model of communication among a number of computers.

FIG. 1 is a model of communication among several computers. As shown in FIG. 1, computer systems 100a–100c are each a single-user computer system. Computer systems 100a, which can be a desktop computer either operating as a stand-alone machine, or as a node in a local area network, has access to a modem 102a which provides an interface to a telephone network 103. Telephone network 103 provides access to other computers, such as computer 100c. Computer 100b is a portable computer which connects to telephone network 103 via a built-in modem 102b (not shown). A number of modems are available for mobile use, including those that couples through a cellular telephone link. Portable computer 100b can also send and receive facsimile transmission. Facsimile transmissions are typically stored as images (i.e. bitmaps).

1. The Control Panel

Figure 2:
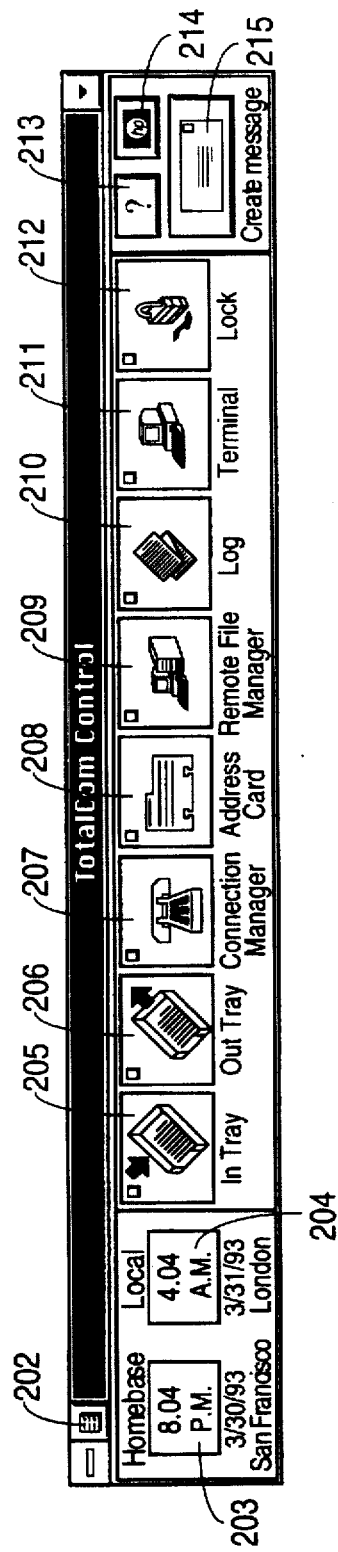
FIG. 2 shows an overall graphical interface of an integrated communication system (ICU) in accordance with the present invention.

One embodiment of an integrated communication system or utility (ICU) provided by the present invention has an overall graphical user interface 200 shown in FIG. 2. Provided in graphical interface 200 are square icon boxes representing the functions selectable by the user to be performed by the ICU. Graphical interface 200 acts as a top-level entry point for the various functional components of the ICU.

The present invention provides a control panel-based ICU. A control panel is an effective means to provide users with convenient and quick access to all necessary communications utilities, while incurring very little screen space. Using the control panel approach, the user can use the remaining screen space for other application programs. These application programs operate in conjunction with the ICU as if the ICU is part of the functionalities provided by application programs. The implementation of the ICU conforms to a common application program interface, so as to allow an application program, such as a word processor, to access the component functionalities of the ICU. As a result, existing application programs can be integrated with a wide range of communications facilities through the ICU.

Selection of icon boxes in the graphical user interface 200 can be accomplished either by a pointing device, e.g. a mouse, or by pressing on a keyboard a predetermined key or a predetermined combination of key strokes. For example, as shown in FIG. 2, an "Out Tray" icon 206 represents the function which prepare an "envelope" for an electronic mail message or a facsimile transmission, for transfer out of the user's work space. An envelope comprises the recipient and destination information, configuration settings for the communication hardware involved, priority, and references to file attachments included in the communication.

To initiate the "out tray" function, the user "drags" the envelope, e.g. a text file and "drops" it on the "out tray" icon. Dragging and dropping are operations of the pointing device familiar to a computer user. One implementation of dragging is initiated when the user presses a button on a mouse device while the cursor on an associated display device is at an initial screen position. The pressing of the button indicates a selection. While holding the button down, the user moves the mouse to associate the selected item to another item displayed. Typically, when the mouse is moved, the computer generates a visual feedback to the user by generating on the display device a corresponding motion of the cursor. Also, while the button is held down, visual feedback, such as a dashed box resembling the outline of the item selected, can be generated to follow the cursor, so as to indicate to the user that a "dragging" manipulation is initiated. The user then selects the item to be associated by releasing the button on the mouse, i.e. "dropping" the item.

The other components accessible from graphical interface 200 are (a) "Configuration," represented by the configuration icon 202; (b) "Clock", represented by the "Homebase" and "Local" icons 203; (c) "In Tray", represented by in-tray icon 205; (d) "Connection Manager", represented by connection manager icon 204; (e) "Address Cards" represented by address book icon 208; (f) "Remote File Manager", represented by remote file manager icon 209; (g) "Log", represented by log file icon 210; (h) "Terminal Emulator" represented terminal icon 211; (i) "Lock", represented by lock icon 212; (j) "Help", represented by "?" icon 213; (k) "About", represented by information icon 214; and "Create Message", represented by "create message" icon 215.

On selecting the "Configuration" icon 202, a configuration dialog box appears. A dialog box is one of many methods in a graphical user interface for an application to receive input data. Normally, when displayed, a dialog box presents a form structure to solicit input data from the user. The user is expected to input information from the keyboard, or to select using a mouse appropriate input values from a displayed menu. In the configuration dialog box, the user specifies a the hardware configuration of the communication equipment, e.g. the modem type, communication port parameters and an identifier of the computer system.

The "Clock" component controls and shows the time of day and date. When traveling, time zone changes can be entered using the configuration tool associated with configuration icon 202. In addition, the "Homebase" and the "Local" icons 203 and 204 display respectively the time and date of two selected locations. Typically, the user would enter identifying text, e.g. a city name, to associate each of "Homebase" and "Local" icons 203 and 204. The time and date of "Local" icon 204 are used to timestamp communications handled by ICU.

The "In Tray" function manages messages received. The In Tray function allows the user to create folders to store incoming messages. Folders are logical file structures which allow the user to categorize and to separately manage incoming messages. In this embodiment, notifications of file transfer and file synchronizations are also managed by the In Tray component.

The "Connection Manager" component controls connections to fax machines, electronic mail services, and host computers. On invoking the Connection Manager via selection of the connection manager icon 207, the Connection Manager manages the equipment of the computer system to effectuate sending and receiving envelopes.

The "Address Cards" component, also known as the "Address Book" component, manages a data base of names, addresses, phone numbers, and other information of individuals, groups of individual, electronic mail services, and host computers. In addition, the Address Book component also relates the user's communication parameters, such as access numbers, to long distance services and calling card information. The Address Book component is described in further detail below.

The File Manager allows the user to manipulate files on both the local machine and a host machine running the ICU of the present invention. Through the File Manager, the user can specify certain files included in both the local machine and the host machine to be automatically synchronized. The File Manager is also discussed in further detailed below.

The Log component maintains status information during a connection. When the log icon 209 is selected, information about previously made connections is displayed.

The Terminal Emulator is a terminal emulation program used to support a conventional interactive connection to a host computer or computer services, e.g. Compuserve™.

Thus, the Terminal Emulator function can be provided by a conventional terminal emulation program.

The Lock component is a security program which prevents unauthorized use of the ICU. When the lock icon 212 is selected, further selection of the icons displayed in graphical user interface 200, other than lock icon 212, are disabled. Selection of the icons in graphical user interface 200 is reactivated when the user selects again lock icon 212 to provide a password matching a previously stored password.

The Help component, when selected via the "?" icon 213, activates the ICU's on-line help facility. The Help component can be implemented using a conventional on-line facility.

The About component, when selected via about icon 214, displays the logo of the assignee of the present invention, and displays information relating to the ICU's version number, part number, and other identifying information.

The Create Message component, when selected via create message icon 214, provides a facility for the user to create a new message. In addition to creating the message body, the Create Message facility allows the user to specify the recipient's or recipients' address information, and also allows the user to specify files which are to be used as attachments to the message created. The new message thus created can be sent to its destination or destinations via fax, electronic mail, or both.

Using a widely accepted convention for graphical user interface, selection of an icon in this embodiment is signalled by the user moving the pointer device to cause a cursor on a display device to move to the position of the icon to be selected. Selection is achieved by pressing and releasing ("clicking") a button of the pointing device. In the ICU of the present invention, an individual component, e.g. any of components 212–215, is activated by clicking on the associated icon once. A visual effect showing opening of a window corresponding to the component is provided to indicate activation of the component. In addition, an "indicator" located at the upper left corner of the icon is illuminated. Clicking on an icon whose indicator is illuminated causes the component's open window to be shown as the top window. The window of an activated component can be hidden by "minimizing", which is signalled by clicking at a predetermined position of the window in rapid succession twice. An activated component having a minimized window is indicated by an illuminated indicator at the upper right corner of the component's icon. When a component's window is closed, i.e. deactivated, the indicator light goes out. In the present embodiment, in lieu of the pointing device, the keyboard can also be used to activate components when a predetermined key or sequence of keys are pressed. For example, the tab key indicates deselection of one component's icon and simultaneous selection of the icon in next component immediately next to the icon which is deselected. An enter key indicates selection of the current icon.

One implementation of the ICU uses a set of dynamically linked libraries (DLL), such as those compatible with Microsoft Windows, which is available from Microsoft Corporation, Redmond, Wash. Under this implementation, each component of the ICU (see the discussion of components above) provides a corresponding DLL. Under the Microsoft Windows DLL convention, each DLL provides a predefined set of procedures, called "methods" and a predefined set of parameters, called "properties", to be accessed by programs external to the component. Thus, by limiting the interface between each component's DLL and the external program to these predefined parameters and procedures, a component can be added or removed with predictability and minimal impact on the remainder components of the ICU.

Figure 3:
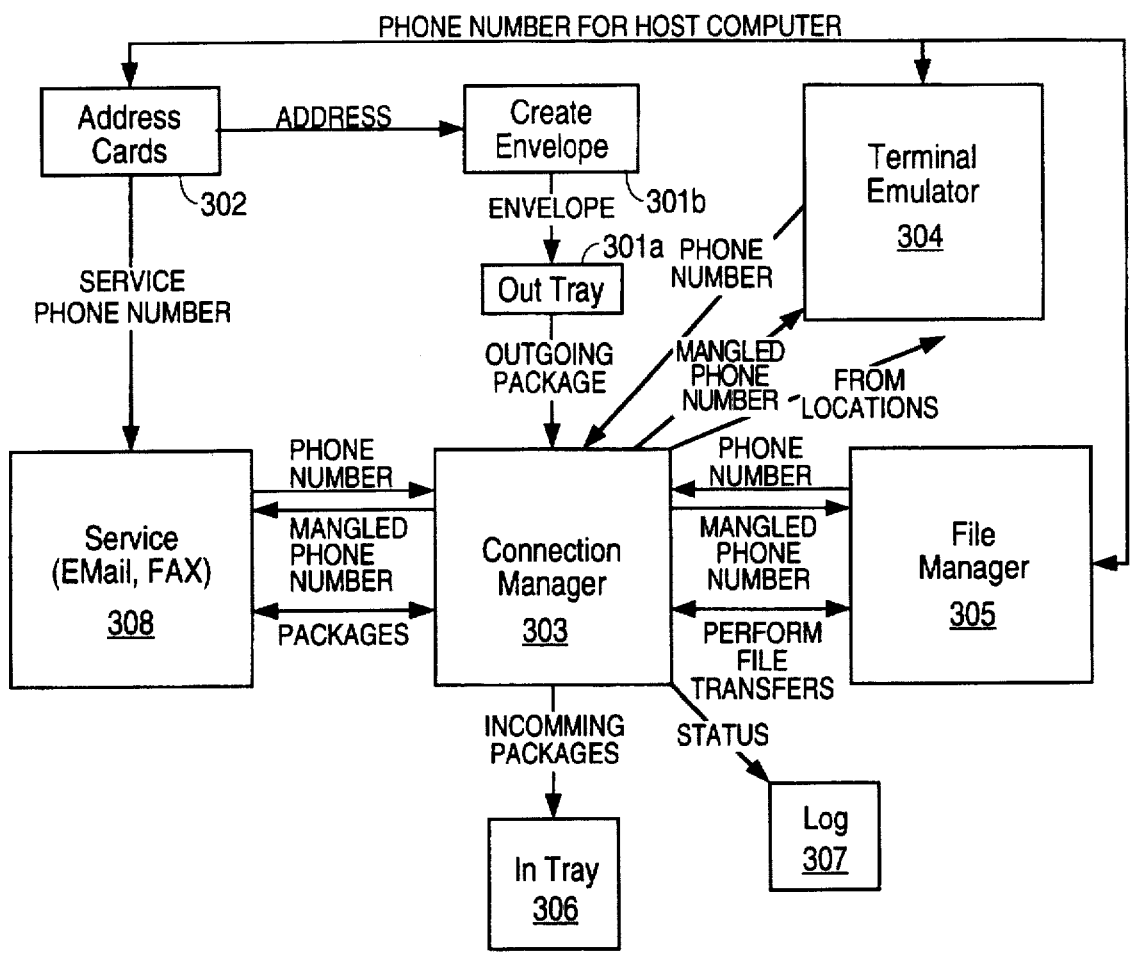
FIG. 3 is a block diagram summarizing the interactions between the dynamically linked libraries (DLLs) corresponding to Connection Manager, Address Cards, In Tray, Out Tray, Terminal Emulator, File Manager, Log and Service components of the ICU of the present invention.

The interactions among the DLLs corresponding to the Connection Manager component, the Address Cards component, the In Tray component, the Out Tray component, the Terminal Emulator, the File Manager component, the Log component and the Service component are summarized in FIG. 3. The Service component, which provides the ICU interfaces to selected service providers, e.g. electronic mail services, will be discussed in further detail below.

As shown in FIG. 3, the Create Envelope block of the Out Tray component (represented by block 301b) obtains from the Address Cards component (represented by block 302) an address of a recipient, creates an envelope bearing the address, and passes the envelope to Out Tray block 301a (The Out Tray component comprises blocks 301a and 301b), which assembles the contents of communication item, and creates a "package." A package is the entirety of the electronic communication item, which includes, in addition to the envelope, also media-specific data. Such media-specific data includes, for example, the bitmap files of a fax image. The package is passed to the connection Manager component, represented by block 303, to be queued for transmission.

The Connection Manager component, which manages the hardware configuration and has access to the information relating to the current communication parameters, e.g. access prefix to an outside line, manages for other components the physical operations of sending and receiving packages. The Connection Manager disassembles packages received at the Service component and forwards the extracted information to the In Tray component, which is represented by block 306.

The Connection Manager component provides the physical file transfer facility for the File Manager component, which is represented by block 305. In addition, the Connection Manager component provides information necessary to effectuate a physical connection to the designated communication medium. For example, the Terminal Emulator component, represented by block 304, provides to the Connection Manager component a telephone number obtained from the Address Cards component, and receives in return a "mangled" telephone number, which is the suitably modified telephone number, including such information as the long distance telephone prefix, telephone credit card authorization codes and dialing instructions. Similar "mangled telephone number" service is provided by the Connection Manager component to the File Manager, the Terminal Emulator, and the Service components.

Status information of the physical connection is provided by the Connection Manager component to the Log component, represented by block 307.

2. The Address Book

The present invention provides the Address Book component to optimize user efficiency in electronic communications. In addition to those typically found in computerized address books, the Address Book component, also known as the Communications Address Book (CAB), offers numerous features for use in electronic communications. Specifically, the CAB's novel features address the issues of: (a) how to prepare electronic mail and fax messages for transmission; (b) how to send the same message using both the fax and the electronic mail facilities and using addresses from the same distribution list; (c) how to handle in a uniform manner electronic mail addresses which are structurally different, according to the individual specifications of the numerous electronic mail services available; and (d) how to handle in a uniform manner the sending of an electronic message, regardless of the complexity of the path necessary to construct such a message.

One problem for which no solution existed prior to the present invention is the uniform handling of both electronic mail messages and faxes. In the prior art, the user has to decide, for each message, whether the message is to be sent by fax or by electronic mail. The choice of whether the message is to be sent by electronic mail or by fax determines which of two very distinct paths are to be taken.

To support multiple communication paths, each of the "address" fields in the CAB, regardless of whether it is field of holding a fax telephone number or an electronic mail address, is implemented as a "combo" box. A combo box is a mechanism adopted in a graphical user interface, such as that provided in the aforementioned Microsoft Windows program, for storing lists. A typical implementation of a combo box provides a window for showing the first element of a list. The full list can be viewed and manipulated when the single element window is expanded ("dropped down") by the user selecting a button icon, which is typically placed next to the single-element window. By allowing specification of address lists, the CAB allows storage of arbitrary lists of addresses.

The purpose of the CAB is to organize in a data base a collection of names, telephone numbers, and other relevant data on the electronic mail, fax, or host computer systems at the recipients (or "destinations") of communications. As illustrated in FIG. 3 above, the CAB supports other components of the ICU by supplying information to these components in a convenient manner.

The CAB consists of an ordered set of address cards (AC). In one implementation, the default ordering is alphabetical, according to the "name" field of each address card. Ordering can be changed by modifying the information in a dialog box, called the "card order dialog box". With respect to address cards, the functions supported by the CAB are card creation, deletion, modification, and transfer of card information between the CAB and other components of the ICU.

In general, many fields on an address card can be edited by bringing the address card to the top and typing directly to the edit field. Other fields in the address card are implemented as check boxes or radio buttons. A check box is a mechanism in a graphical user interface to indicate the value of a binary variable. Typically, when a predetermined value of the binary variable is selected, a "check mark" appears in the displayed box. A radio button, is a mechanism in a graphical interface to present mutually exclusive choices. Thus, radio buttons are typically presented as a group, and only one of the radio buttons can be set to the "ON" value at any given time. In a radio button, rather than a check mark, an illuminated dot is used to indicate the predetermined (i.e. "ON") value of the binary variable. Selections represented by check boxes or radio buttons can be changed by clicking on the icons of these check boxes or radio buttons.

As mentioned above, many fields are implemented by combo boxes, which accept tagged lists of items. (A discussion of 'tagged' lists is provided below). The 'preferred' selection may be made simply by selecting an item from the drop down list, which is displayed when the button associated with the combo box is selected. In the present embodiment, combo boxes are often accompanied by an "Edit" button which is used to invoke the edit function that allows the tagged list to be edited.

Figure 4:
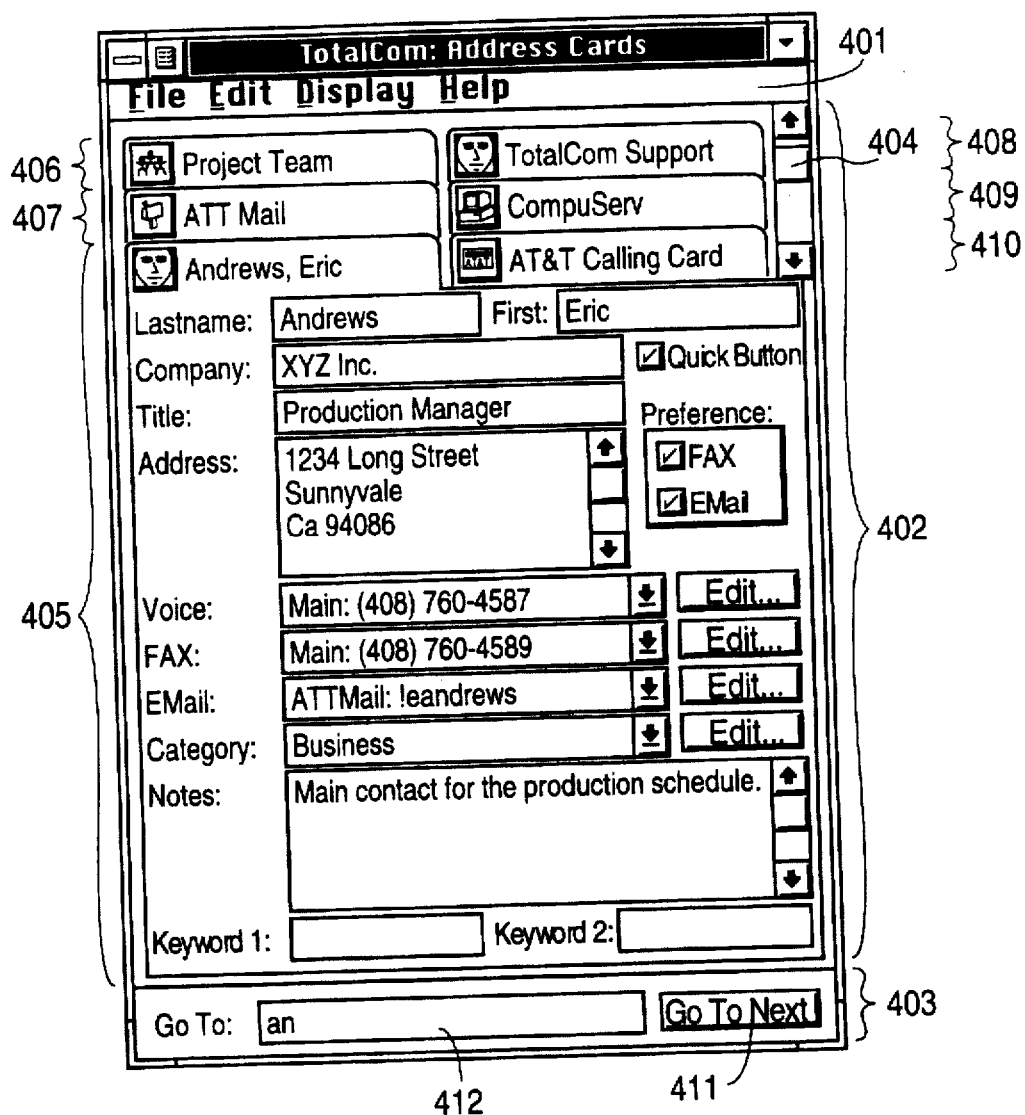
FIG. 4 shows the window of the Communication Address Book (CAB) in accordance with one embodiment of the present invention.

FIG. 4 shows in detail the top-level window of the CAB. As shown in FIG. 4, a menu bar 401, from which a user can select one of the several menus "File", "Edit", "Display" and "Help," is displayed. Also shown in FIG. 4 is a portion 402 of the card stack, and a card finder window 403. Each of areas 401-403 provides control of some portions of the CAB's functionalities.

The interactions between the user and card stack area 402, and associated scroll bar 404, allow address card navigation, and card editing. The card finder associated with area 403 provides a rapid means to locate a given card. As discussed above, cards in the CAB may be dragged and dropped to other ICU components, to indicate passing of parameters between such the ICU and such other components. Menu bar 401 controls all other functions of the CAB. The address cards in the CAB are automatically loaded whenever the CAB is selected from the control panel of the ICU, and saved whenever the CAB window is closed.

The card stack shown in card stack area 402 includes all cards currently being shown and ordered in accordance with information specified in the card order dialog box. As shown in FIG. 4, card stack area 402 shows (a) the current card (AC), shown in its entirety ("on top"), and (b) the name and type icons of the several address cards 406-410 in the CAB. Scroll bar 404 is included to allow the user to select cards not immediately displayed. Thus, scroll bar 404 allows the user to navigate through the cards as if the card stack is maintained in a list box. Card stack area 404 shows the tab of each address card under the top card. The displayed portion of each address card, other than the top card, shows the value of the "name" field and an icon representing the card type. Currently, five card types are supported: a person card, a group card, a computer card, a calling card and a service card. The name field of a person card, for example, contains the name of the person referenced.

When the tab of another address card is "double clicked" on, i.e. selected by pressing and releasing a button on the mouse in rapid succession twice, the double-clicked or selected card is moved to the top, with several of the address cards following the selected card shown above the selected card. When a tab is single clicked on, it is selected but not moved to the top. When a card is selected, any other selected card then existing, and any fields within such other selected card are deselected. Disjoint selection is also supported. Selection is indicated by the tab inverting. Selected cards may be dragged from the card stack and dropped on other components of the ICU. The number of address cards with their tabs displayed in the card stack area 402 is determined by the size of the window.

All address cards in the database are shown in the card stack by default and ordered alphabetically by the value of the "Name" field. The Name field and the "Notes" field are the two text fields common to all address card types. Address cards can also be (i) ordered by type, and then alphabetically ordered by the value in the Name field, or (ii) ordered by type and within each type, ordered in accordance with up to two other fields (referred to as "primary" and "secondary" order fields) of that type. Custom fields, i.e. fields defined by the user, rather than by the ICU, can be created in an address card. Such custom fields can also be used for ordering address cards in the card stack.

Figure 5:
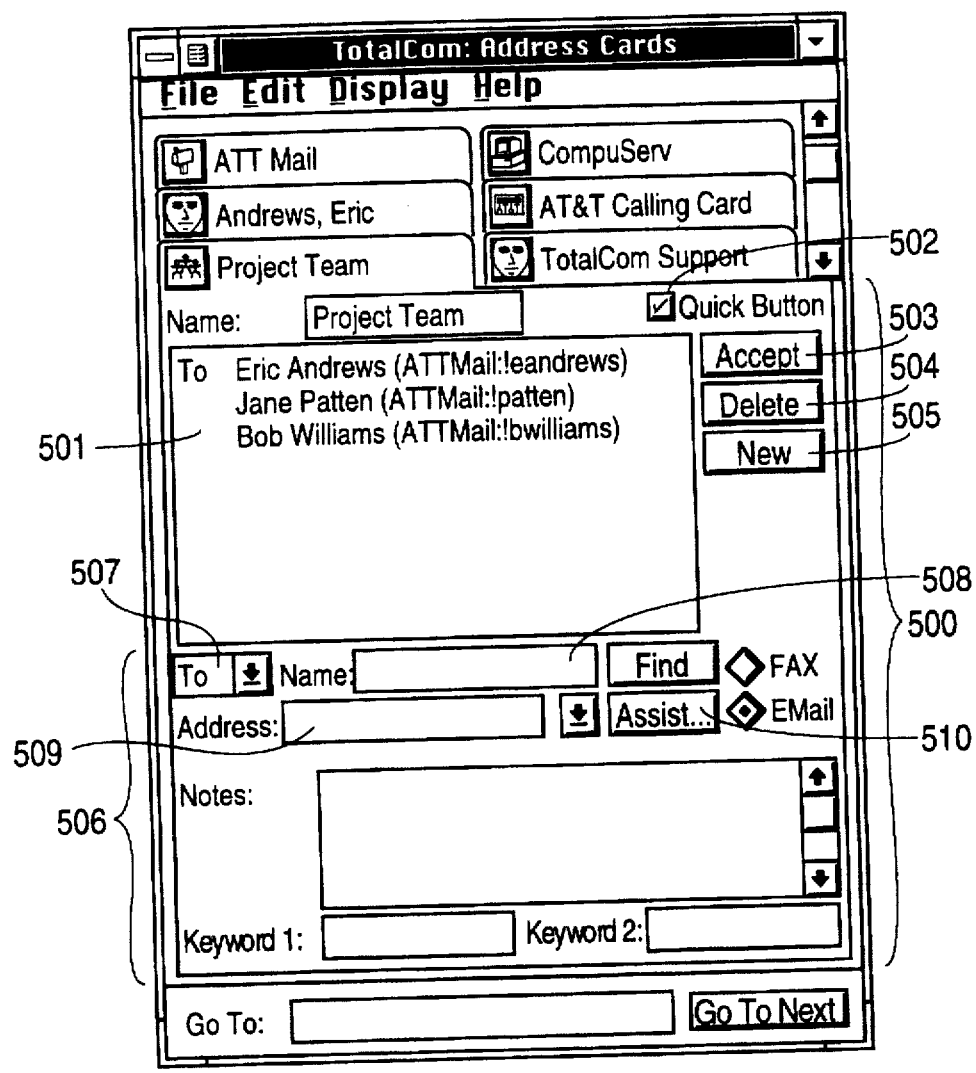
FIG. 5 shows an example of a Group type address card 500 of the present invention.

The present embodiment also allows the user to restrict for display on the card stack only those address cards having a string or sub-string in a specified field. In this manner, a sub-set of the database can be selected. The card order dialog box is shown in FIG. 5. The card order dialog box is discussed in further detail below.

The card finder area 403 is displayed below the card stack area 402. As a text string is entered into the "Go to" text field 412, the text string is matched to each of the address card following the top address card. The first address card which matches the field used in ordering the card stack is brought to the top. The card finder, which is not case sensitive, provides the user an incremental search capability. For example, starting with an empty field, with a default stack order, when an 'h' is pressed, the first card with a name starting with 'H' or 'h' is displayed. If an 'o' is then pressed, the card finder will cause to be displayed the first 'HO', 'Ho' or "ho" card. The incremental search continues as each character is entered until the desired card is displayed.

An icon button 411 is provided to find the next address card in the card stack matching the string specified in the "go to" field 412. If there is no next match, the card finder returns to the first match.

Unless a field in the currently displayed address card, or a tab in the address cards underneath the currently displayed card, is clicked on, the card finder will have "input focus", i.e. any input data from the keyboard is assumed to be used as input data to the card finder. If backspace is pressed, indicated the cancellation of the most immediate character typed, the top card displayed is the last match of the previous card finder string before the cancelled character is typed.

Menu bar 401 provides menus "File", "Edit", "Display" and "Help". Each of these menus is further described below.

Under the File menu, the items "New Card", "Import", "Export", "Page Setup", "Print", "Print Setup" and "Exit" are available for selection. The New Card menu item is a "cascading" menu. A cascading menu is a menu which contains sub-menus. The New Card menu allows further selections of the various address card types: Person, Group, Computer, Calling Card and Service. As a address card type is selected, a blank address card of the specified type is displayed to allow the user to input the requisite information. In this embodiment, a Service type address card, which is used to define additional communication services, requires supporting files in addition to information appearing on its displayed face. At present, service cards are added in conjunction with a system upgrade; the present embodiment allows service cards to be provided only by the assignee of the present invention, when the ICU is shipped to the user, and cannot be added by the user.

As mentioned above, the Person type address card holds personal and destination information about a specific person or entity. The Computer type address card holds access telephone numbers and configuration data about a computer. The Group type address card holds a list which references Person type address cards, and/or other Group type address cards. The Calling Card type address card holds long-distance service calling card information. Finally, the Service type address card holds information on specific electronic mail services.

As previously discussed, the Name field, which is present in each of the various types of address cards, is displayed in the address card's tab area, next to the icon representing the type of the address card. While the Name field on a Person type address card is split into First Name and Last Name fields, for many purposes, e.g. the purpose of searching, the First Name and Last Name fields are concatenated as a single Name field.

A Person type address card has fields to hold the person's Company, Title, postal Address, Category, and a Note field.

The Person type address card also has a Preference field, for specifying whether the person prefers to receive communication in the form of electronic mail messages, faxes, or both.

Further, the Person type address card has three list fields "Voice", "Fax", and "Email", for holding respectively a list of voice telephone numbers, a list of fax telephone numbers and a list of electronic mail addresses. The elements of each of these lists can be "tagged", i.e. distinguished from other elements of the list, by a string preceding the telephone number. An expected use of the tags is, for example, to distinguish home and work telephone numbers. There is also a 'Preferred' item on each list. The preferred item is the item normally displayed.

Pre-designed tags are provided in the list of electronic mail addresses. These pre-designed tags are "AT&T Mail", "MC Mail", "Sprint Mail", and "Compuserve Mail". The data input by the user in these items are verified for proper format.

Like the lists for voice and fax telephone numbers, the Category field is a regular combo box, with edit capability, that can hold a list of multiple items. The Category field can be used to order the Person type address cards in the CAB. For example, the CAB can be selected to display only address cards that has "business" specified in their Category fields. A Person type address card can belong to one or more categories. The multiple categories are identified on the address card, with each category being separated from another category by a semicolon. The predesigned categories for a Person type address card are 'Business' and 'Personal'.

When the "Edit" button next to the Category edit field is clicked, a dialog box is displayed. The user may add a category by typing a name into the edit field and then clicking "Add" in the Edit Menu. When an item in the Category list is selected, the text of the category appears in the list box. Clicking "Delete" from the Edit Menu removes the category from both the category list and the edit field. The user may also change the contents of the edit field and click Change.

Figure 13:
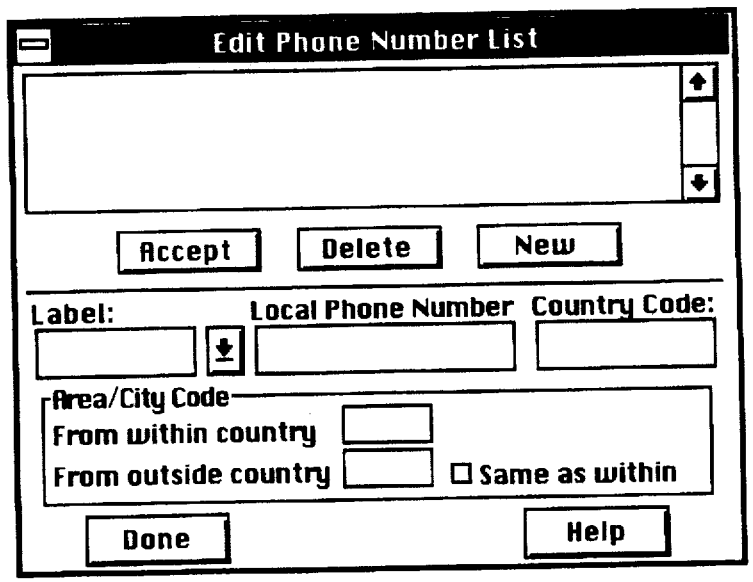
FIG. 13 shows a dialog box 1300 which is used to edit a tagged list associated with one of the "Voice" or "Fax" fields in a Person type address card.

Next to each of the combo boxes "Voice", "Fax", and "Email", is a button labelled "Edit". Clicking on the "Edit" button activates an edit function which allows the user to modify each of these lists. A dialog box 1300, which is shown in FIG. 13, is displayed when the "Edit" button next to either the "Voice" or the "Fax" field is clicked. As shown in FIG. 13, dialog box 1300 allows the user to specify, in addition to the local telephone number, an Area or City code, and a Country code. The user can optionally specify the Area or City code to be used from outside the specified country. Normally, but not always, the Area or City code is the same for both inside and outside the country. One notable exception is the United Kingdom.

Figure 15A:
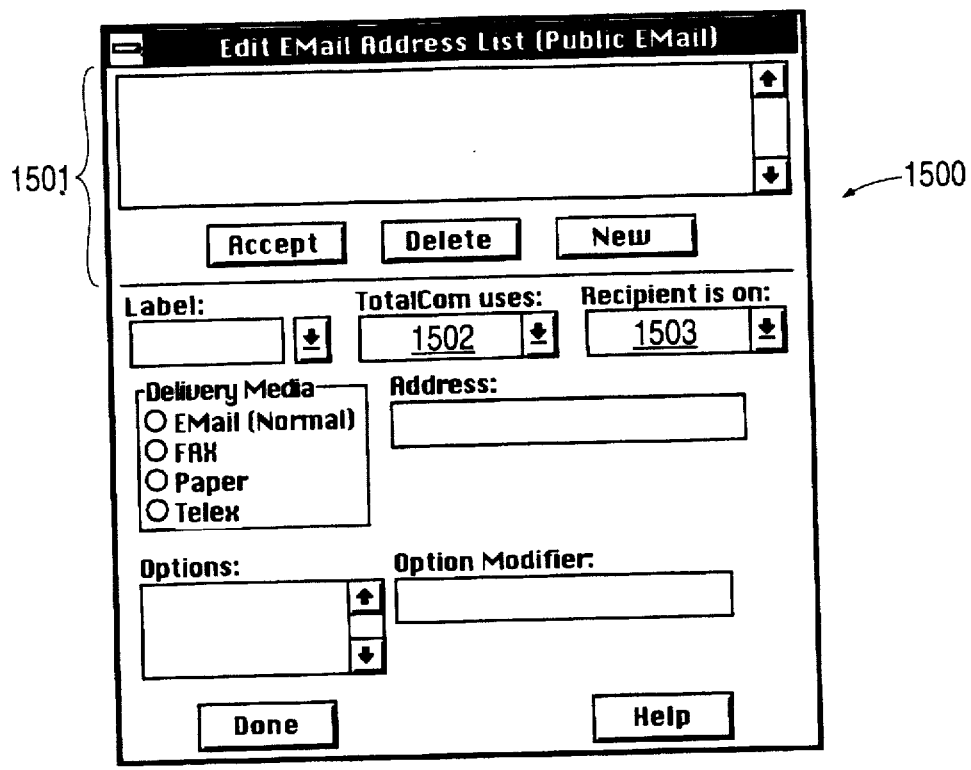
FIGS. 15a, 15b and 15c show respectively a dialog box 1500, a dialog box 1550 and a dialog box 1580, which are used alternatively to edit a tagged list associated with the "Email" field in a Person type address card.
Figure 15B:
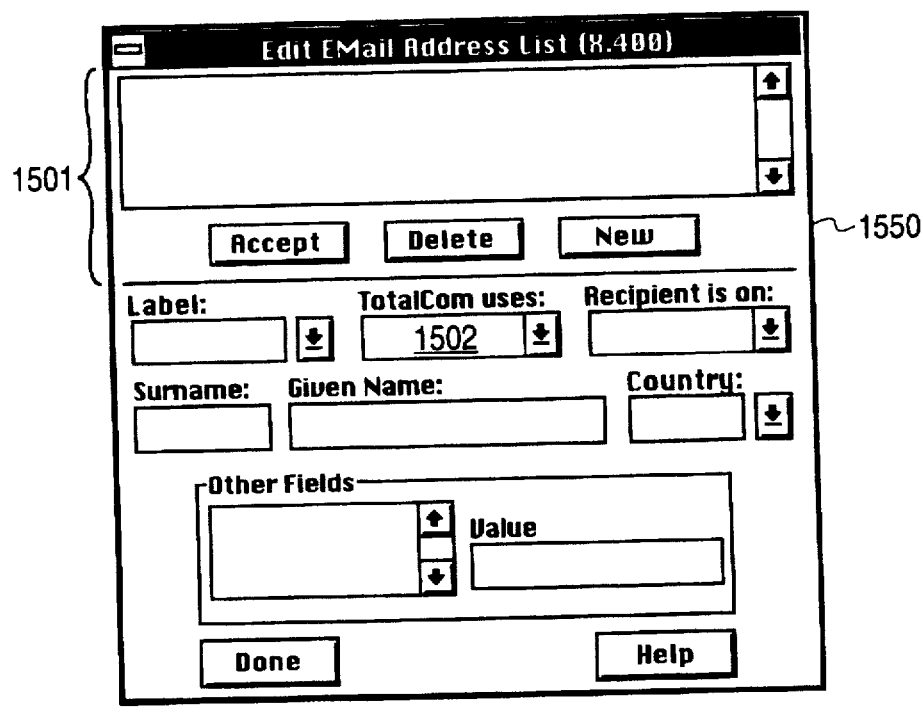
Figure 15C:
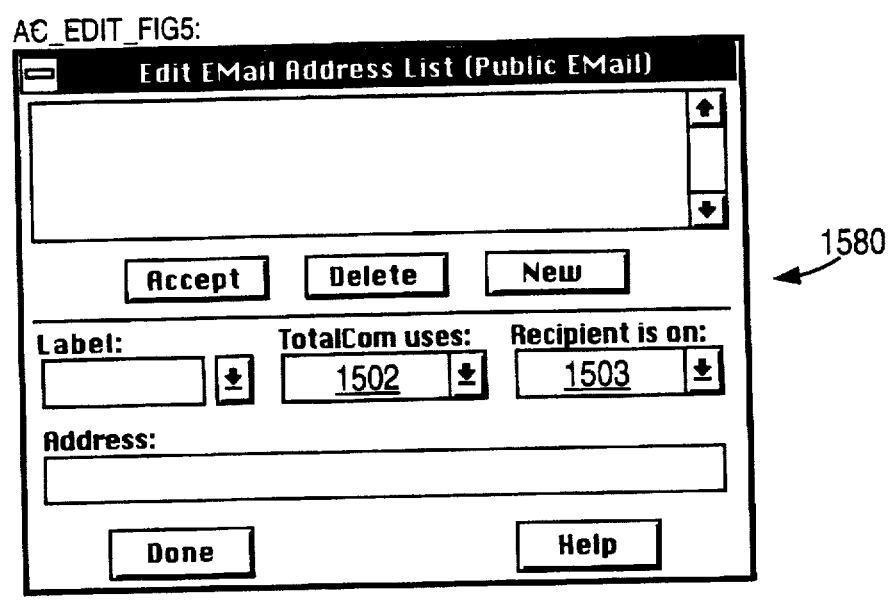

Clicking the "Edit" button next to the "EMail" field displays one of dialog box 1500, dialog box 1550, and dialog box 1580, shown respectively in FIGS. 15a, 15b and 15c, for editing the "Email" tagged list. The "TotalCom uses:" field, shown as field 1502 in FIGS. 15a, 15b and 15c, has as default value the name of the user's Primary electronic mail service, and the "Recipient is on" field (field 1503) has as default value the recipient's primary electronic mail service. The lower portions of dialog box 1500, dialog box 1550, and dialog box 1580 are different, based on the contents of the "Recipient is On" and the "TotalCom uses" fields. Specifically, dialog box 1500 is used for public electronic mail services, e.g. ATT, MC, CompuServe, Sprint; dialog box 1550 is used for X.400; and dialog box 1580 is used for Internet and Others. The "Recipient is on" combo box is pre-loaded with all electronic mail services installed, X.400, Internet and others.

An additional check box field in the Person type address card is the "Quick Send" check box, which indicates whether or not the name in the Name field of the address card should appear in a "Quick Dial" radio button in a menu of the ICU used in preparing an envelope.

An example of a Group type address card 500 is shown in FIG. 5. As shown in FIG. 5, the Group type address card 500 has a field "To" (generally indicated by reference numeral 501) holding a list of names of other address cards. Each of the names in the "To" list is also shown along with the 'Preferred' address. Each name on the "To" list corresponds to a Person type address card. The 'Preferred' address is the value provided in the "Preference" field of the referenced Person type address card. This preferred address can be an electronic mail address, if the preferred mode of communication is electronic mail, or a fax telephone number, if fax is the preferred mode of communication. If the Preference field of the referenced Person indicates both fax and electronic mail, two entries are shown, indicating respectively the preference for fax in one entry, and the preference for electronic mail in the other entry.

The "To" list of a Group type address card can reference names of Person type address cards, as well as other Group type address cards. In this embodiment, editing the Preference field in a Person type address card changes the indicated preferred address on any Group type address card referencing the Person type address card. Like a Person type address card, the Group type address card also has a check box field QuickDial, shown as check box 502. Further, like its counterpart in the Person type address card, check box 502 is used to indicate that the Group type address card is to be included as a Quick Dial button in an envelope prepared by the ICU.

There are two combo boxes (fields 507 and 509) and an edit field (field 508) located below the list box (field 501) in a Group type address card. When an item in list 501 is selected, combo box 507 lets the user select one of 'From', 'To', 'Cc', or 'Box'. In addition, edit field 508 provides the name of the item selected in field 501, combo box 509 displays several addresses associated with the selected item from which the user can select the address to use. The user can select the "Delete" button from the Edit Menu to remove the selected item from the group list displayed in list 501. The user can also select a different address from the address combo-box. Clicking on the "New" button clears combo box 509 and edit field 508, and sets the selected item in combo box 507 to 'To', without affecting the selected item of list 501. The user can type into edit field 508 a name and specify one or more addresses in the combo box 509. Selecting "Add" in the Edit Menu adds the specified person to the group list displayed in list 501. Instead of typing an address, the user may click the "Assist" button (button 510), which displays a dialog box similar to one of the "Email" dialog boxes 1500, 1550 or 1580 shown in FIGS. 15a, 15b or 15c. "Assist" button locates the "Email" information related to the address card specified in the "Name" field. To add address cards from the CAB to a Group type address card, the Group type address card is dragged out of the CAB and dropped anywhere except another ICU window. This drag and drop operation with the Group type address card creates a window containing the Group type address card. The user then navigates through the CAB to locate the address cards of persons or entities to be included in the group. The located address cards are dragged to the newly opened window. Only Person and Group type address cards can be included in a group. The selected address cards' names are added to the group along with the Preferred electronic mail or fax address. If the Preference field of the address card is set to both fax and electronic mail, then two entries, specifying respectively the fax and electronic mail addresses, are added to the group. If a Person type address card of the list has only one preference specified, when selected, the address combo box 509 displays both fax and electronic mail addresses, allowing the user to switch between selecting electronic mail and fax easily. If a preexisting Group type address card is dropped into the open window containing a new Group type address card, the name of the preexisting Group type address card is added to the list in the new Group type address card. Address cards are added to the 'From', 'To', 'Cc', or 'Bbc' 507 lists independently.

Figure 6:
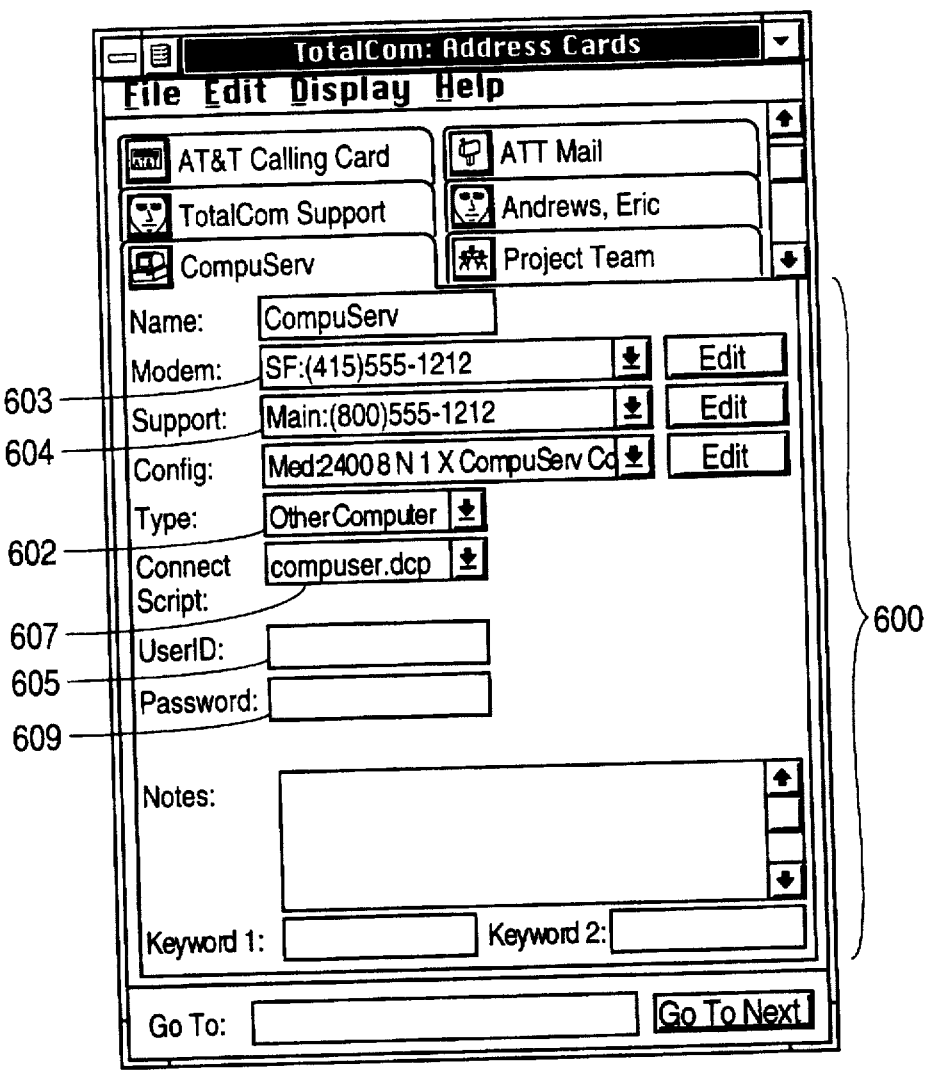
FIG. 6 shows an example of a Computer type address card 600 of the present invention.

An example of a Computer type address card 600 is shown in FIG. 6. In this embodiment, two types of computers can be defined on a Computer type address card. These two types of computers are (a) ICU type computers and (b) non-ICU type computers.

A Computer type address card is required for each ICU type computer which the user connects. The ICU type computer to be included in the address card stack includes the local system (i.e. the machine including the instant card stack). At present, the present embodiment supports file transfer and file synchronization operations only on ICU type computers. The connection to a non-ICU type computer is made via the Terminal Emulator component. Typical non-ICU type computers include bulletin board systems (BBS), on-line information services, and mainframe computers.

Computer type address card 600 has the fields: (a) "Type", shown as field 602, for specifying whether the computer is ICU or other type; (b) "modem", shown as field 603, for specifying one or more dial-in telephone numbers of the computer; (c) "support", shown as field 604, for specifying one or more telephone numbers of the support organization of the computer; (d) "Config", shown as field 605, for specifying one or more modem configurations supported by the answering modems of the computer; (e) "UserID" and "Password" fields, shown as fields 605 and 606 respectively, for specifying access identification information to be supplied when initiating a session with the computer, and (f) "Connect Script" field, shown as field, for specifying a connect script for the Terminal Emulation component to use when initiating a session with the computer (Connect Script is only necessary for a non-ICU computer). A connect script is a procedure, typically written in a command level language, to provide the application program level protocol between the calling computer and the called computer.

Figure 14:
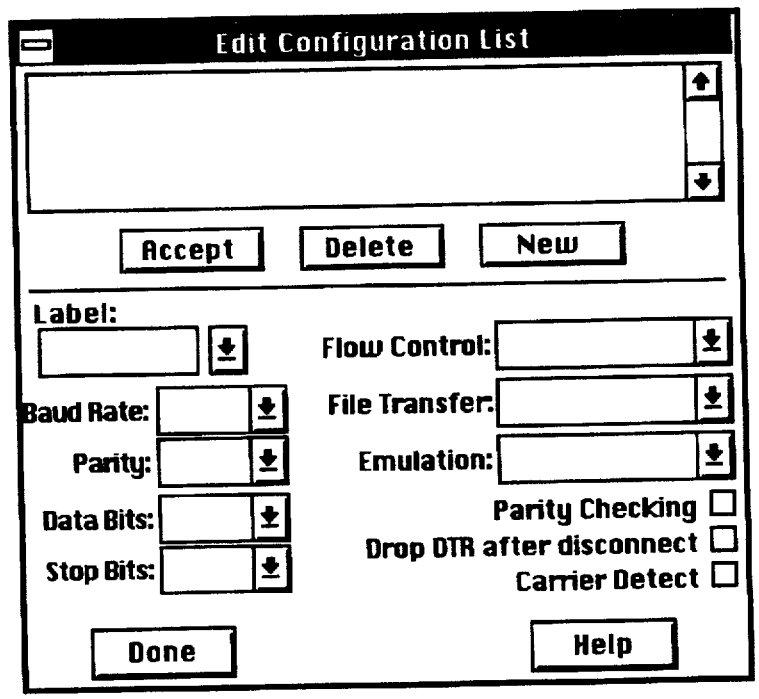
FIG. 14 shows a dialog box 1400 which is used to edit a tagged list associated with the "config" field in a Computer type address card.

Like the "Voice" and "Fax" fields of a Person type address card, the "modem", "support" and "config" fields of the Computer type address cards are tagged. The Script field is a combo box holding references to connect scripts currently defined. Clicking the "Edit" button next to the "config" field displays a dialog box 1400, which is shown in FIG. 14. As shown in FIG. 14, dialog box 1400 allows the user to specify the modem configuration and the transfer protocols. There are no pre-defined tags for the "config" field.

Figure 7:
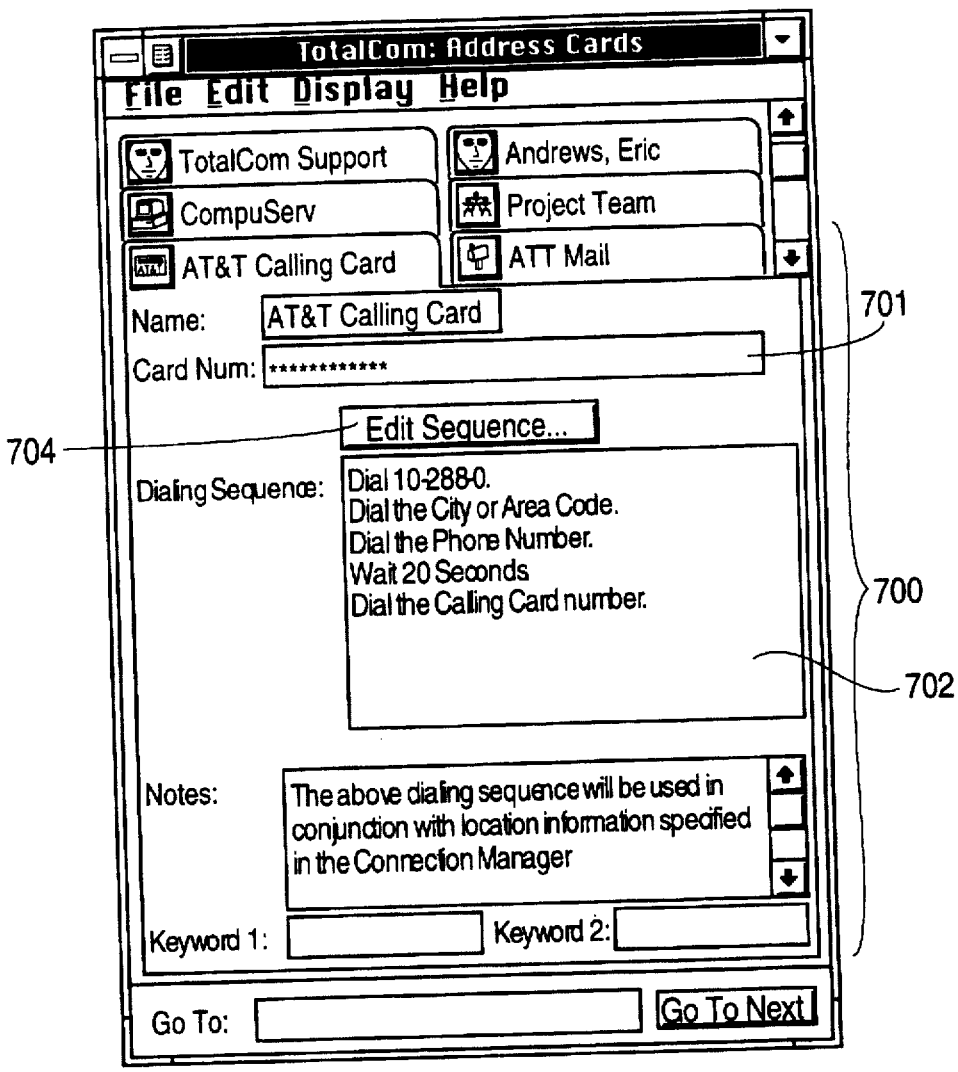
FIG. 7 shows an example of a Calling Card type address card 700 of the present invention.
Figure 8:
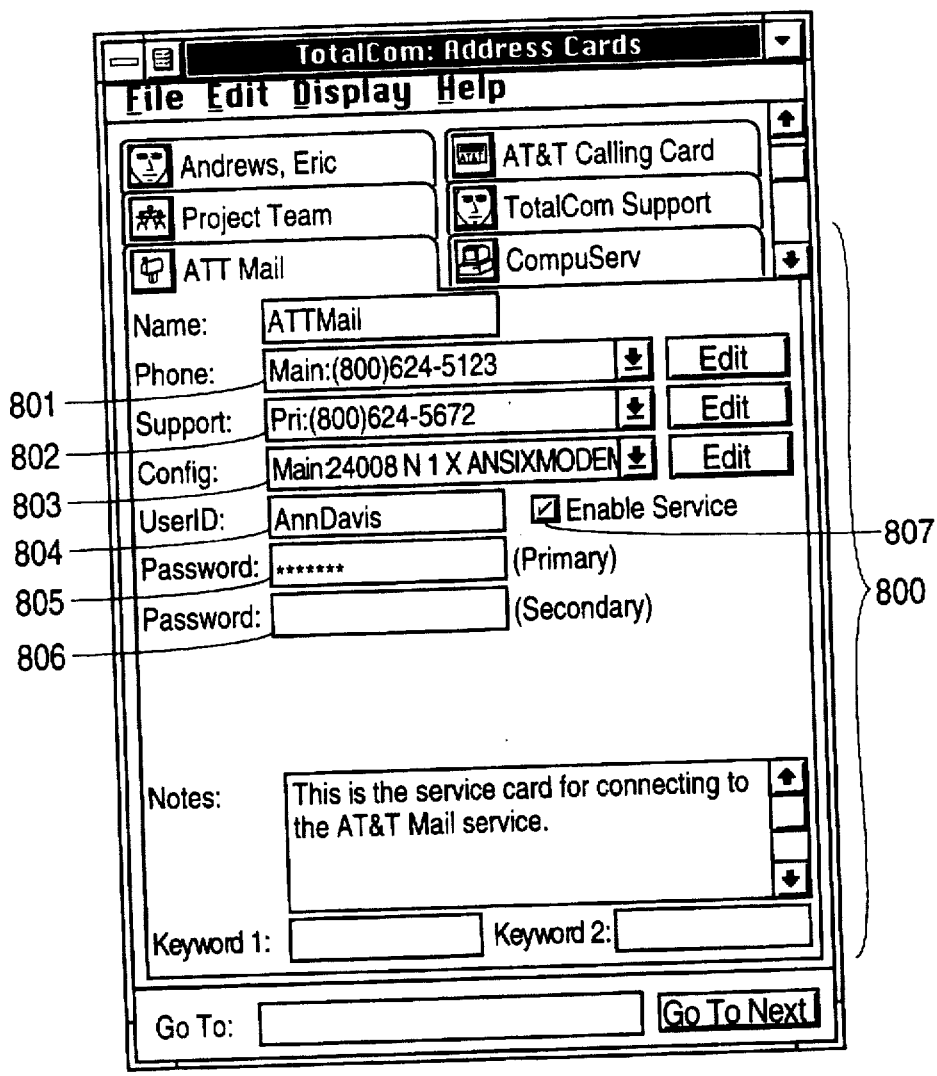
FIG. 8 shows an example of a Service Type address card 800 of the present invention.

The Calling Card type address card has information about the long distance carrier. An example of a Calling Card type address card 700 is shown in FIG. 7. Calling Card 700 has the fields: (a) "Card Num", shown as field 701, for holding multiple card numbers, and (b) "Dialing Sequence", shown as field 702, for specifying dialing sequences to access the long distance carrier under different circumstances. The "Edit Sequence" button, shown as button 704, is used to enable editing of a dialing sequence.

The Service type address card contains information for contacting an electronic mail service with which the ICU communicates. In this embodiment, the Service type address cards are special because the user can neither create nor delete them. When a new CAB is created, these Service type address cards are included. At present, new Service type address cards are added to the ICU only by an upgrade method provided by the assignee of the present invention. Service Cards can, however, be edited by the user to update such information as telephone numbers, or account identification information. As expected, the Name field of a Service type address card cannot be edited.

Service type address card 800 has the fields: (a) "phone" and "support", shown respectively as fields 801 and 802, for specifying tagged lists of telephone numbers used for data and support connections; (c) "config", shown as field 803, for specifying a tagged list of modem configurations; and (d) "User ID" and two "Password" fields, shown respectively as fields 804, 805, and 806, for specifying the user identification, and the primary and the secondary passwords.

An "Enable Service" check box, shown as check box 807 is provided to allow the user to indicate whether the specified service is enabled. Any and all services of the Service type address cards in the CAB may be enabled by checking the corresponding "Enable Service" check boxes. When enabled, any electronic mail message sent by the ICU to a destination on an enabled electronic mail service causes the electronic mail message to be sent directly to that enabled service. In this embodiment, an enabled service is polled for messages for the ICU whenever a connection to the enabled service is made. Such a connection can be initiated through the Connection Manager, regardless of whether a message is at the Out Tray to be sent to a destination at the enabled service. When a connection is made, the enabled service is queried for any incoming mail envelopes for the calling machine.

In some Service type address cards, three Script fields can be provided for holding information of the login, the logoff and the modem usage procedures. In yet other Service type address cards, a number of other special fields peculiar to the specified service is provided.

To use an address card of any type, the user selects the address card by clicking on the address card's tab, dragging and dropping the address card to an application program represented in the ICU control panel. The ICU then passes the address card information to that application program. For example, dragging a Group type address card to an envelope will create a distribution list in the envelope. If the "quick send" field is checked in the Group type address card, the card's icon and name will appear in the envelopes as a "quick dial" button.

The ICU allows the user to drag an address card to any of the control panel's windows (i.e. an activated component of the ICU), except the window where the address card originates. Dragging and dropping to and from open windows allows the user to view more than one address cards at the same time and provides a simple mechanism for building Group type address cards.

As discussed above, the Person, Service, and Computer types of address cards each contain fields which are implemented as lists. For example, the "Voice" field of a Person type address card is a list of tagged telephone numbers, where a tag provides a comment on the usage of the telephone number, such as "Home", "Work" or "Car". In each of these lists, a user can identify an item from the list as a default preference. For example, if the user wants to send electronic mail to a person, dropping the person's Person type address card envelope results in an envelope addressed to the person's preferred electronic mail service. The address used on the envelope is the default electronic mail address selected in the list of the "EMail" field.

As indicated above, the "Import" menu item under the File menu imports address information from several popular file formats and application programs. The CAB is capable of importing address card information from other application programs. Clearly, the data formats of other application programs must be converted. The imported information, provided it is in a supported file format, can be optionally updated by a subsequent file synchronization operation, whenever the original file has changed, or if a DDE (Dynamic Data Exchange) mechanism is used, whenever the CAB is opened. The DDE mechanism is an industry standard data exchange mechanism, which is defined by Microsoft Corporation, Redmond, Wash.

The present embodiment can import files in the following formats: (a) CSV[1] (comma separated field) format; (b) TSV[2] (tab separated field) format; (c) GDB[3] (Omnibook 300 PIM database) format; (d) PR1 or PR2[4] (the

[1] CSV is a text file format, in which adjacent fields are separated by a comma. In the CSV format, when a field contains a comma, the entire field is enclosed in double quotes. Records in a CSV file are terminated by a CR/LF combination. The first record in a CSV file provides the names of the field. The present embodiment does not support file synchronization for CSV files.

[2] The TSV format is very similar to the CSV format, except that the Tab character, rather than the comma, is used to separate fields. File synchronization is also not supported for TSV files.

[3] The GDB format is defined by the Omnibook 300 PIM Database. Explanation of the GDB format can be found in the Omnibook 300 PIM 'Database Documentation', available from Hewlett-Packard Company, Palo Alto, Calif. Unlike the CSV and TSV format files, a GDB format file is not an ASCII file. File synchronization between the CAB and a GDB file is provided by an application program interface supported by the Hewlett-Packard Company.

[4] PR1 and PR2 are the formats used by the Packrat Phone Book, available from Polaris Software, to store it's address book information. A PR1 or PR2 file can be kept in file synchronization with the CAB using the DDE mechanism. Packrat Phone book) format; (e) DBF[5] (the Act! address book) format; and (g) the Lotus Organizer[6] format.

[5] The DBF format used by the Act! address book, available from Contact Software, Inc. Since the DBF format is actually compatible with the well-known DBase III file format, which is supported by the DBase III program from Borland International, Scotts Valley, Calif., data from other application programs using the DBase III file format can also be imported by the CAB. A DBF format file can be kept in file synchronization with the CAB by parsing the DBase III files according to the above-mentioned DBase III format.

[6] The ICU imports address book information using an "application program interface" (API) provided by Lotus Corporation, which markets the Lotus Organizer.

Figure 9:
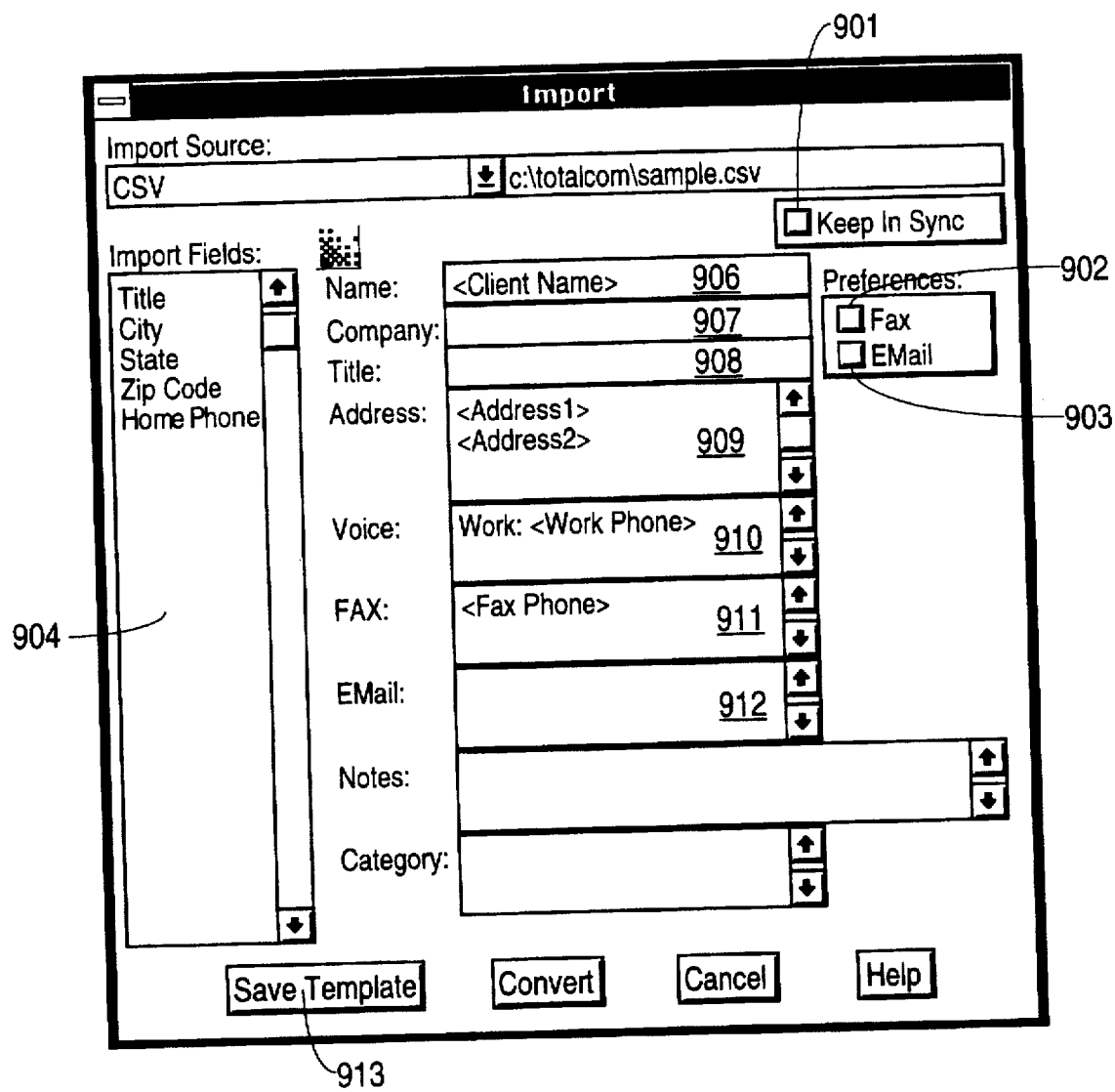
FIG. 9 shows a dialog box 900 used for associating the fields of a file containing information to be imported with the corresponding fields in the CAB.

When the "Import" item of the File Menu is selected, the CAB initiates a dialog box, e.g. the dialog box 900 shown in FIG. 9, for creating a template which associates the fields in the files containing the information to be imported and the CAB fields. Dialog box 900 is used to specify the importation of a Person type address card. Other types of address card can also be imported. If the imported file is in a file format for which file synchronization is provided, a check box "keep in sync", shown in FIG. 9 as check box 901, is provided for the user to specify whether file synchronization is desired.

Initially, the fields "FAX" or "EMail", which are provided radio buttons 902 and 903 respectively, are not selected. Also, the "keep in sync" check box 901 is initially grayed. (Graying is a representation in a graphical user interface to specify a "non-applicable" item. Typically, gray is the conventional color for indicating an item as deactivated or non-available.) Dialog box 900 is a template containing the fields defined in a Person type address card. To completely specify an import operation, the user first specifies the data format of the file to be imported using a file name. (In the cases of the Lotus Organizer and the Packrat Phone Book formats, no file name is necessary). Once the file format is specified, the CAB reads in the names of the defined fields of the imported file, and display the fields in display area 904. The fields of the file to be imported and the corresponding field in the CAB are associated in a series of drag and drop operations between the fields in display area 904 and the edit boxes 906-912 in display area 905. As shown in FIG. 9, the names of fields of the address card are shown bracketed by angle brackets (<>). As shown in FIG. 9 also, tags may be added by typing them into a field in front of a field name, such as shown in edit box 910 of the "Voice" field, where the tag "work:" is added in front the <Work Phone> field. Where file synchronization is supported for the imported file format, the "keep in sync" check box 901 is ungrayed.

When the "Save Template" button 913 is selected, the template for the currently selected format is saved. Thus, the user can maintain a template for each file format for subsequent importation of files of the same format. When the "Convert" button is selected, file importation occurs. During the importation process, the Preference settings are obtained in the following manner: if an address card already exists for the name, the current preference settings in the address card are maintained; otherwise, the preference settings in the template are used in the address card created. Further, if the preference settings are in conflict, e.g. if the preference settings specify electronic mail, but no electronic mail address is provided, then the Preference field is modified to match the available address information.

The address cards of the CAB can be synchronized with their source databases either through DDE or by parsing the database file. As indicated above, file synchronization is supported only for certain formats. For the supported formats, any new address cards added to the source database are added to the CAB at connection time. The CAB does not erase any field not imported.

Whenever the CAB is activated, and while a file in an application program that supports DDE is specified to synchronize with the CAB, the user is queried to determine if the links are to be updated. If so, the source application program is loaded, and an update request is sent. To update the information in the CAB, the date and time of the last modification to the source database file are examined to determine if the such last modification occurs after the time the source database file was imported. If modification occurred more recently than the last date of importation, address information is updated in the CAB.

The "Export" item from the File Menu displays an "Export" dialog box, which is used for specifying information necessary to convert the address cards in the CAB into a file format compatible with other application programs. Person, Group or Computer type address cards can be exported. In the present embodiment, an export operation exports all cards of the specified type. The file formats supported for export are: CSV, TSV, GDB, and DBF, which are described above with respect to the import operations.

Figure 10:
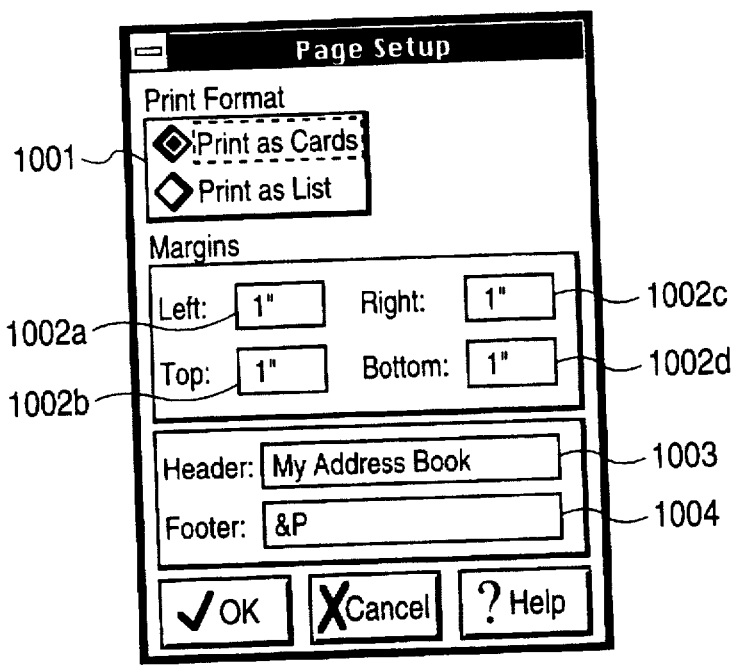
FIG. 10 shows a dialog box 1000 for specifying the page format for printing address cards of the CAB.
Figure 11A:
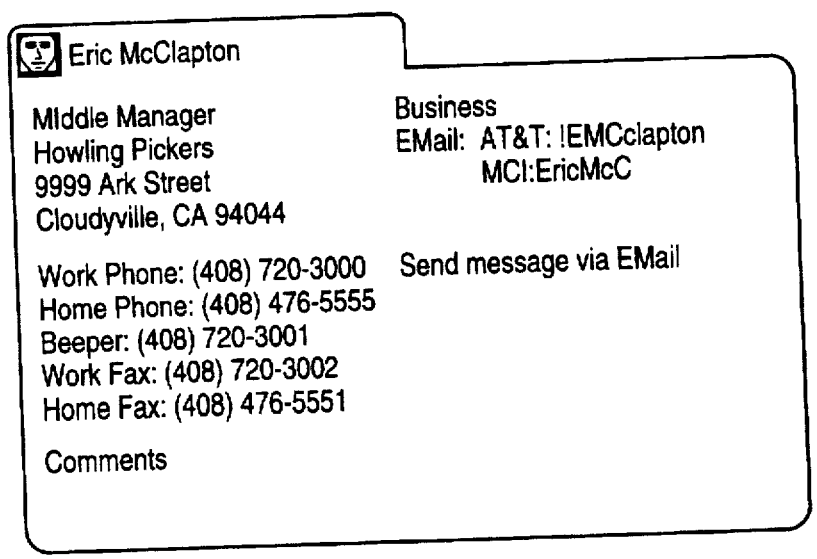
FIGS. 11a and 11b show respectively an address card being printed as a card image and in a list format.
Figure 11B:

The "Page Setup" item of the File menu, when selected, displays a dialog box 1000, which is shown in FIG. 10. Dialog box 1000 allows the user to specify a page format to be used for printing. As shown in FIG. 10, a radio button group 1001, labelled "Print Format" allows the user to select between printing an address card as a card image, or in a list format. These formats are shown respectively in FIGS. 11a and 11b.

In addition, four edit fields a–d under the label "Margins" are provided for specifying the page margins and edit fields "Header" and "Footer", shown as edit fields 1003 and 1004 are provided for specifying a text string to be printed in the top margin (Header) and bottom margin (Footer) of each page. The "Header" and "Footer" strings can include predefined variables, each variable being indicated by a '&' symbol preceding its one character name. For example, the variable "&P" represents the page number, the variable "&T" represents the time of day, and the variable "&D" represents the date. The values of these variables are supplied during printing.

The "Print" item in the File Menu allows the user to print one or more address cards. The configuration of the printer supporting the "Print" item is provided by a previous selection of the "Print Setup" item of the File Menu. When selected, the "Print Setup" item displays a printer selection dialog box for selecting a printer from a list of one or more printers, and for specifying the parameters of the printers on the list.

The "Exit" item from the File Menu prompts the user to save the current database prior to initiating a shut-down procedure for the CAB. At the minimal, the name of the current database, the ordering and the identity of the top card are saved.

The "Edit" menu holds the selections "Undo", "Cut", "Copy", "Paste", "Delete", "Select All" and "Find." The "Undo" item reverses the last action.

The "Cut" item copies the current selection, which can be a field in an address card, or the address card itself, to a work area called the "clipboard", and then deletes the selection. If a field in an address card, rather than a card, is selected, the selection is kept in the keyboard as a text string. When an address card is selected, the address card is kept in the clipboard in a text string under the CSV representation (see above regarding the CSV representation).

The "Copy" item in the Edit Menu copies the current selection, which is either a field in an address card, or the address card itself, to the clipboard.

The "Paste" item retrieves from the clipboard either an address card, or a field of an address card. A retrieved address card is placed onto the address card stack, and a retrieve field of an address card is provided to the field indicated by the cursor. If the field is pasted into a tagged list, the pasted text is checked for proper formatting before the field is added to the list. Cards may be pasted at any time, and will always appear on top of the card stack. The "Paste" item is grayed when there is no suitable data on the clipboard.

The "Delete" item in the Edit Menu deletes the current selection, which is either a field in an address card, or the address card itself. When the selection is an address card, the user is prompted to confirm the requested deletion.

The "Select all" item selects all address cards in the address card stack. The "Find" item, when selected, displays a dialog box into which the user can enter a search string. The search string is matched to all fields of the address cards following the top address card on the address card stack. The first address card having a field containing the search string is selected and brought to the top of the address card stack. When the search string is not matched, an error message is returned to the user. After the first match is found, selecting the Find item again finds the next match.

Figure 12:
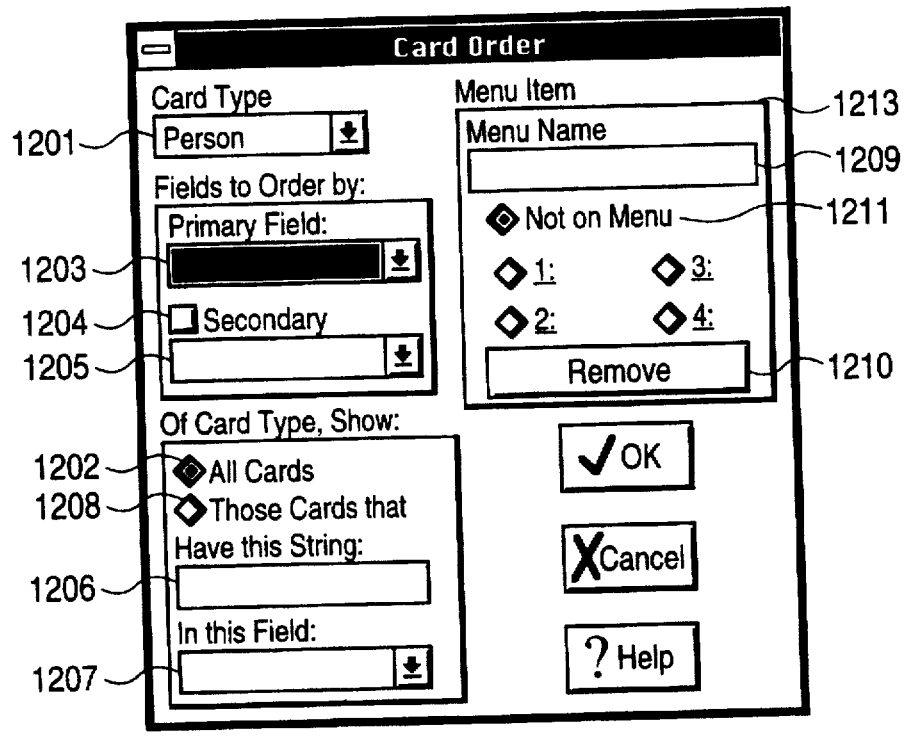
FIG. 12 shows the card order dialog box 1200 used to specify the order of address cards displayed in the card stack of the CAB, in accordance with the present invention.

The "Display" menu includes items "Define Order", "Default Order" and "Columns". When selected, the "Define Order" item creates a "card order" dialog box, which is shown as dialog box 1200 in FIG. 12. As initially displayed, the fields of card order dialog box 1200 are filled with the currently active values. By default, the values of the "Card Type" and "Of Card Type, Show" fields, shown in FIG. 12 as fields 1201 and 1202, are set to 'All Types' and "All Cards" respectively. In addition, the default "Primary order" field, shown in FIG. 12 as field 1201, is set to "Name". A "Secondary" field, which includes check box 1204 and combo box 1205 are grayed by default, as are the fields "Have this string:" (shown as field 1206) and "In this Field:" (shown as field 1207) below the "Those Cards that" radio button (shown as radio button 1208). By default, also, the "Menu Name" edit field 1209 and the "Remove" button 1210 are grayed, and the "Not on Menu" radio button 1211 is selected. Since the default "Card Type" is set to 'All Types', the fields "Primary Field" and "In this Field", i.e. combo boxes 1203 and 1207, are restricted to either 'Name' or 'Notes'. When a specific address card type is selected, combo boxes 1203 and 1207, as well as "Secondary" field 1205, can be filled with the field names specific to the specified address card type. The "Secondary" check box 1204 is ungrayed when a specific address card type is specified.

The dialog box 1200 allows the user to define in the "Menu Item" area 1213 up to four address card order specifications that can be selected and displayed under the Display menu. When one of these address card order is selected, the address card stack is re-displayed in the specified order. The undefined menu item positions are grayed. Defined menu items are shown as a number with the specified name after it. Specifications of address card orders are saved independent of the CAB database.

When any radio button associated with any of the items 1–4 within the "Menu item" area 1213, other then "Not On Menu" (radio button 1211), is selected, the "Menu Name" field 1209 is ungrayed, and filled by the text string associated with the selected radio button. If one or more of the items 1–4 are defined, the "Remove" button 1210 is ungrayed also. Selecting "Remove" button 1210 undefines the selected item or items. Changing the radio button selection will change the "Menu Name" in the Menu item area 1213.

The "Default Order" item in the Display Menu causes the card stack to be ordered in the default card order, which is explained above.

The "Columns" item of the Display menu controls the number of columns of card tabs displayed by the CAB. By default, two columns of address card tabs are displayed. When two columns of address card tabs are displayed, the Columns item provides a selection "Display 1 Column of Cards". Selection of the Columns item would, naturally, causes a redraw to display only one column of address card tabs and toggles the Columns item to provide the selection "Display 2 Columns of Cards."

The Help Menu lists the items "Index", "Search", "Troubleshooting", "Using Help", and "About". Selecting any of these items provide an on-line help message concerning the selected item.

The CAB is implemented using an indexed database, which is viewed by the rest of the ICU as an object (the "CAB object") with numerous globally accessible methods, which are discussed in the following. (Although the following discussion uses terminology specific to the C++ programming language, one of ordinary skill will appreciate readily that the present invention can be implemented in other programming languages as well).

The "Methods Common to all Card Types" section, provided below shows the names and general description of the methods available in the CAB object applicable to all address cards (i.e. the properties of a "generic address card").

As shown in the "Methods Common to all Card Types" section below, each address card is constructed (i.e. created in memory) by a method "TRdxCard" which can directly invoked with or without a pointer to a window object. When invoked with a pointer to a window object, the address card can be edited. When invoked without a pointer to a window object, the address card is-read only. The address card is destroyed by the method "~TRdxCard", which releases the representation of the address card in memory.

Each address card has the string variables "pName", "pFirstName", "pNotes", "pUser1Data" and "pUser2Data" to store the name, the first name (only used in Person type address cards), a note, and two user-defined data strings.

A "DefineFields" method is provided to cast the generic address card constructed by the TRdxCard method into the specified type, using the definitions of the fields of each card type. In addition, a "WriteDefaultData" method provides to the address card, which is typed by the DefineFields method, the default values of the defined fields.

A "WriteFields" method is provided for writing field values from, for example, an edit function in a window, onto the address card.

An address card is written into the CAB, which is an indexed data base, by the method "SaveToDB". A number of methods are provided to retrieve information of the address card. The method "GetRecordSize" retrieves the size in bytes of the address card. The method GetRootRecord returns a pointer to the head of the master list of all address cards. The method "GetTypeRecord" returns the head of a list of address cards of a given type under the "root" record retrieved by the GetRootRecord method. A method "GetBitmapo" constructs the bit map, i.e. the image, of the address card for display on a video monitor. Another method "GetType" returns the type of the address card, if the address card is defined.

In this embodiment, a method, in the form of an operator, provides a convenient means of comparing two address cards to determine if they are identical. A "GetSize" method and a "SetSize" method are provided to get and to set the size of the address card, respectively, for such purpose as printing. To display an address card in memory, a method "AttachToWindow" associates the address card with a window in which the address card is to be displayed. Removal of the address card from the window is accomplished by the method "RemoveFromWindow".

Two methods, both known as "Display", in accordance with the convention of "overloading" in the C++ language, are provided to display the address card. By setting a boolean parameter "param" to true, the selected Display method displays the address card only as a tab, as when the address card is not the top address card on the stack.

The name and the icon, which are typically shown on the tab of a displayed address card, are drawn by the "DrawIconAndName" method.

The methods specific to the Person type address cards are shown in the "Person Card Methods" section, provided below. Methods "WriteFields", "DefineFields", "WriteDefaultData", "GetType", and "GetBitMap" are inherited from the generic address card described above.

A Person type address card is constructed by one of two "TPersonCard" methods for use respectively for by the constructor of the card stack, and for general use, other than by the card stack. The method "~TPersonCard" destroys a Person type address card. The strings "pCompany", "pTitle", "pAddress", and "pCat", tagged lists "pVoice", "pFax", "pEmail", boolean variables "pSpeedDial", "bFaxPref" and "bEmailPref" correspond respectively to the fields "Company", "Title", "Address", "Category", "Voice", "Fax", "Email", "quick send", and the "Fax" and "Email" fields within the Preference field.

A method "GetCat" is provided to retrieve the string value of the Category field. The "Load" and "unLoad" methods are used to initialize static data structures. In this instance, the bitmap of an icon specific to the Person type address card is created for display use.

The methods provided for a Computer type address card are shown in the "Computer Card Methods" section, provided below. Like the Person type address cards, two constructor methods, both named "THostCard", are provided to create a Computer type address card. One of the THostCard method is provided for general use and the other THostCard method is used by the card stack, respectively. A Computer type address card is destroyed by the destructor "~THostCard". Methods "WriteFields", "DefineFields", "WriteDefaultData", "GetType", and "GetBitMap" are inherited from the generic address card described above.

The tagged lists "pModem", "pSupport", "pConfig", type identifier "HostType", strings "password", "Connect", "pUserID" and "pSnapshotFile" are provided to support fields "Modem", "Support", "Config", "Type", "password", "Connect Script", and the file synchronization mechanism respectively. (In the file synchronization mechanism discussed below, a "snapshot" file containing the state of a file system in a remote storage devices, e.g. a hard disk, is kept.) In addition, two boolean functions "ToConfig" and "FromConfig" are provided to write onto, and to extract from, the Computer type address card configuration information. Like the Load and Unload methods of the Person type address cards, the Load and unLoad methods produce and destroy a bitmap image of the Computer type address card.

The methods for a Group type address card are shown in the "Group Card Methods" section, provided below. Three constructor methods, all named "TGroupCard", are provided to create a Group type address card. One of the three constructor methods is provided for general use. The second constructor method is used by the card stack. The third constructor method, which takes as an argument another address card, clones a new address card from an existing address card. A Computer type address card is destroyed by the destructor "~TGroupCard". Methods "WriteFields", "DefineFields", "WriteDefaultData", "GetType", and "GetBitMap" are inherited from the generic address card described above. The present embodiment provides the operator "=" to compare two Group type address cards for equality.

The arrays "To", "From", "CC", and "BBC" and boolean variable "bSpeedDial" are provided to support the "To", "From", "CC" and "BBC" lists specified in field 501 of FIG.

5, and the check box "Quick button" respectively. Like the Load and Unload methods of the Person type address cards, the Load and unLoad methods produces and destroys a bitmap image of the Group type address card.

The methods for the Group type address card also includes a method "build" for restoring local data and the methods "NewDestRef", "MoveDestRef", "DelDestRef", and "GetNextDest" for navigating through list of addresses associated with each entry of the Group list in a Group type address card.

The methods for a Calling Card type address card are shown in the "Calling Card Methods" section, provided below. Two constructor methods, both named "TCallCard", are provided to create a Calling Card type address card, for general use, and by the card stack. A Calling Card type address card is destroyed by the destructor "~TCallCard". Methods "WriteFields", "DefineFields", "WriteDefaultData", "GetType", and "GetBitMap" are inherited from the generic address card, as described above.

The string "CardNumber" and the object "pDialSeq" are provided to support the "Card Num" and "Dialing Sequence" fields respectively. Like the Load and Unload methods of the Person type address cards, the Load and unLoad methods produce and destroy a bitmap image of the Calling Card type address card.

The methods for a Service type address card are shown in the "Service Card Methods" section, provided below. Two constructor methods, both named "TServiceCard", are provided to create a Service type address card, for general use and for use by the card stack. A Service type address card is destroyed by the destructor "~TServiceCard". Methods "WriteFields", "DefineFields", "WriteDefaultData", "GetType", and "GetBitMap" are inherited from the generic address card described above.

The tagged lists "pPhone", "pSupport", "pConfig", the strings "pUserID", "pPassword" and "PAltPassword", and boolean variable "bEnabled" are provided to support the fields "Phone", "Support", "Config", "UserID", "Password (primary)", "Password (secondary)" and the check box "Enable Service" respectively. Like the Load and Unload methods of the Person type address cards, the Load and unLoad methods produce and destroy a bitmap image of the Service type address card. The boolean function "ToConfig" extracts from a Service type address card configuration data.

The remaining methods of a Service Type Address Card "GetAddressTemplate", "MakePackage", "GetNote", "GetDistList", "GetAttachments", "Open", "Close", "Abort" and "Queue" are used to call into a Service DLL for assembling an envelope into a package compatible with the conventions of the target communication service. These methods are discussed below in conjunction with the Serivce DLL.

3. Integration of Service Providers

The present invention allows automatic integration of new service providers, e.g. service providers for electronic mail services and fax connections, into an existing software product. The architecture of the ICU according to the present invention allows integration of a new communication service by simply adding a Dynamic Linked Library (DLL). Thus, the present invention allows incremental upgrade, i.e. without requiring new versions of the components of the ICU to be simultaneously upgraded at the time the upgrade is performed.

The present invention requires a uniform "object oriented" interface for each service DLL. Each service DLL has a corresponding Service type address card in the Address Book. The Service type address card supplies all the user-configurable parameters of the service. For example, for an electronic mail service, the Service type address card contains the user identification ("User ID"), the requisite password or passwords, and telephone numbers for accessing the service.

Generally, the principal task of a Service DLL is to assemble pieces of the message, which collectively form the envelope, and create a "package" which conform to the format requirements of the communication service to which the package is intended. The relationships among the Service DLL, the Service type address card, the envelope and the package are shown in FIG. 16.

Figure 16:
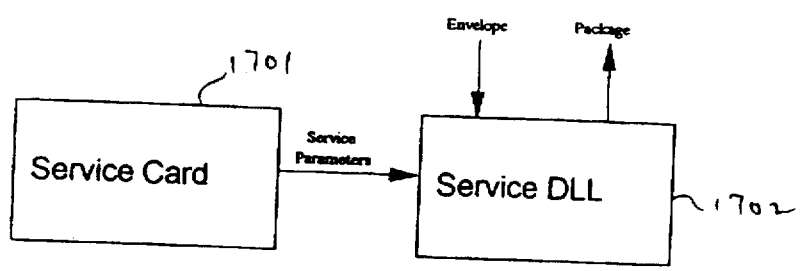
FIG. 16 shows a Service type address card 1901 providing service parameters to a service DLL 1902, to assemble a package from an envelope.
Figure 19A:
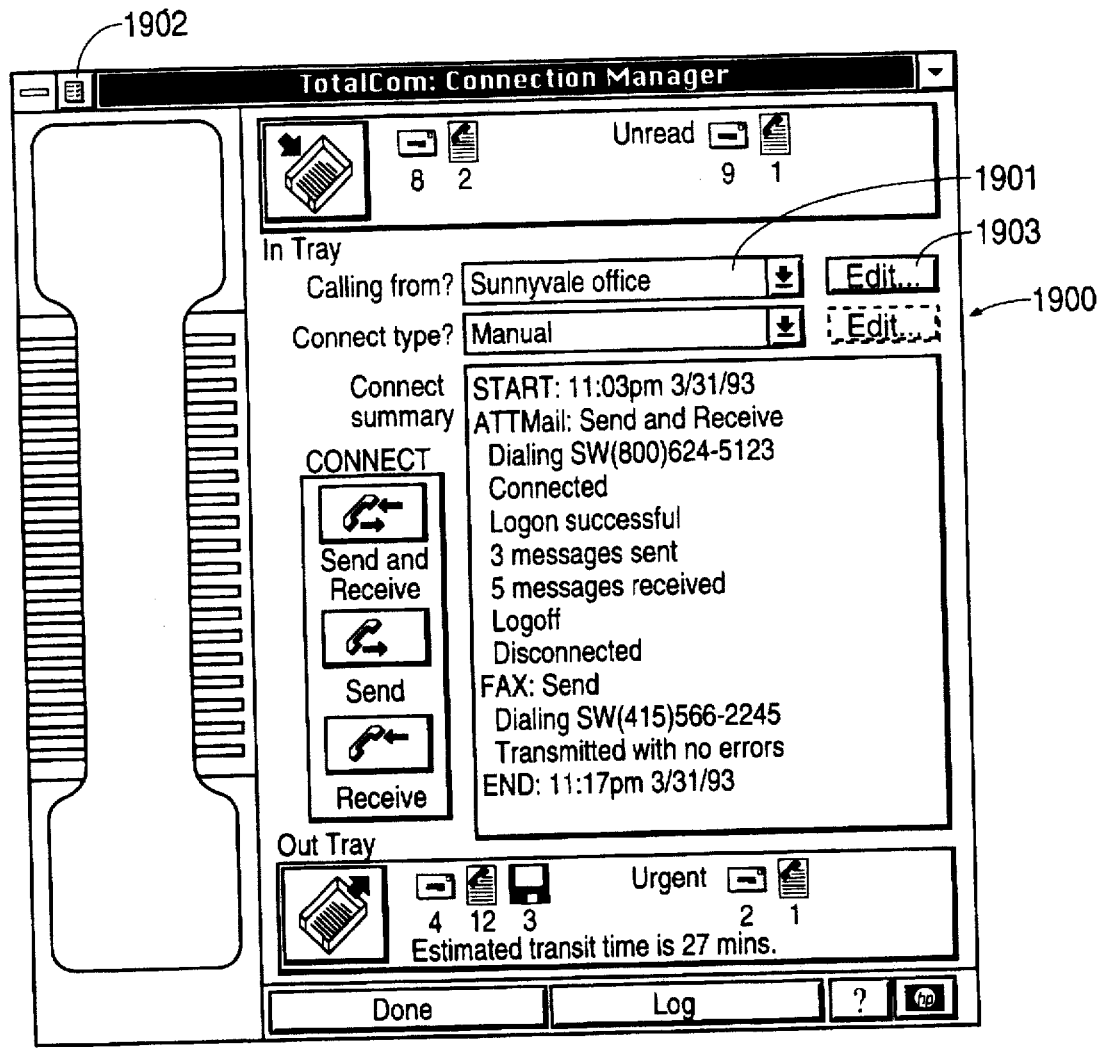
FIG. 19 summarizes the portions of a telephone number contributed by the Connection Manager component and the Communication Address Book (CAB) component to build a telephone number to be used to reach an addressee, in accordance with the present invention.
Figure 19B:
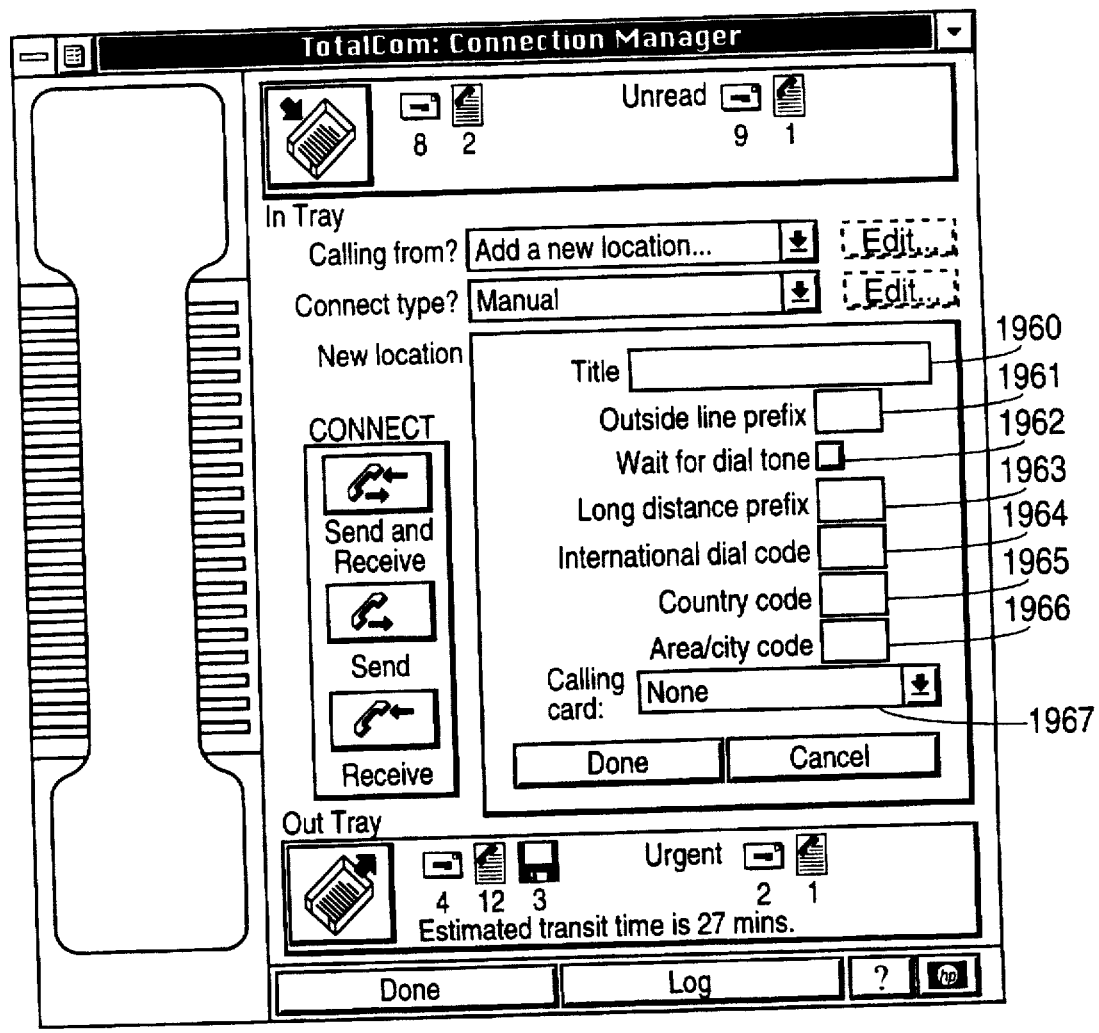

As shown in FIG. 16, to prepare a package from an enveloped received, a Service DLL 1702 invokes the methods of Service type address card 1701 to retrieve service specific parameters. The methods provided in the Service cards are "GetAddressTemplate", "MakePackage", "GetNote", "GetDistList", "GetAttachments", "Open", "Close", "Abort" and "Queue".

The "GetAddressTemplate" method retrieves a template for an address compatible with the conventions of the service provider. This method is also used to verify that an address is in the correct format.

The "MakePackage" method receives (i) an array "PackList" indicating the items included in the package, (ii) an array "DistList" containing a list of recipients, (iii) a string "pSubject" for including a descriptive string, (iv) a string "pNote" for including the content of the message, (v) an array "arrAttachList" containing a list of attachment files, and (vi) a time stamp "tTime". The MakePackage method is used to prepare a package in a format which is conforming to the requirements of the target communication service.

When a package is received from a communication service, a method DestroyData strips from a package received Service Specific data. A method "GetNote" retreives from a package an included message. A method "GetDistList" retrieves from the package a list of recipients and casts the retrieved list of recipients into a Group type address card. Attachment files are retrieved from a package using the method "GetAttachments", which returns a list of strings containing the file names of the attachments.

A method "Open" is used by the Connection Manager component to initiate a session with the target service. While the connection is open, packages are queued for transmission, using the "queue" method. If an error occurs, service activity can be suspended using the "abort" method. When all packages are successfully queued, the method "close" is used to close the session. The session is actually closed when a "Service finished" status message is received from the communication service.

4. The Connection Manager

The present invention separates the "To" and "From" location information in its data base. Separating the "From" and "To" information allows great flexibility for the data base to adapt to mobile nature of an address book. For example, since an address book is frequently used by a travelling user, separating the "To" and "From" information results in a more powerful communication utility. Under the approach of the present invention, the details of access to a common carrier are handled by the software, rather than explicitly by the user. A separation is made in the present invention to separate addressee-specific information from the addressee non-specific information, e.g. information relating to a calling card, or a communication service.

The Connection Manager component of the ICU provides independent specification of the "To" and "From" information. FIG. 17 is a dialog box 1900 of the Connection Manager component. As shown in FIG. 17, dialog box 1900 comprises combo box 1901, labelled "Calling From?". Combo box 1901 also includes a tagged list. Combo box 1901 provides a quick way for the user to specify the dialing information, e.g. the access code to a long distance carrier, specific to the location being dialed from. Each entry in combo box 1901's list includes a description and dialing information. Combo box 1901 has two fixed entries: "PROMPT ME" and "Add New Location". "PROMPT ME" is used when the user wishes to dial from a location, but does not want to define it as an entry in combo box 1900. "Add New Location" adds a new entry to the combo box 1900. "Calling From?" information can be edited by selecting "Config" button 1902. A dialog box 1950 appears when the "Add New Location" of combo box 1900 is selected.

Dialog box 1950, invoked by the "Add New Location" item, is displayed in FIG. 18. As shown in FIG. 18, a "Title" edit field 1960 receives a "title" string, which is used to identify a location, e.g. "Sunnyvale Sales Office". The other fields in dialog box 1950 are "Outside line prefix" (field 1961), "Wait for dial tone" (field 1962), "Long Distance Prefix" (field 1963), "International Dial Code" (field 1964), "Country code" (field 1965), "Area/city code" (field 1966) and combo box 1967, labelled "Calling Card".

The "Outside line prefix" field is provided to specify the digit or digits used in a private business exchange (PBX) to request access to an outside telephone line. Field "Wait for dial tone" is a check box provided for specifying a pause requirement after dialing the outside line prefix. The "Long distance prefix" field specifies any access code necessary to reach the long distance carrier. The "International dial code" field specifies the prefix to make an international call. In the US, the international dial code is 'O11'. The "Country code" field specifies the country code of the location where the user is dialing from. If the country code field is blank, the default country code is assumed. The "Area/City code" field specifies the area code (or the city code, if used outside of the US) of the location where the user is dialing from. If the "Area/City Code" is blank, the default area/city code is assumed.

Combo box 1967 holds a list of calling card type address cards defined in the CAB. In addition, combo box 1967 can also contain a special entry "None", which indicates that the user does not wish to use a calling card. A "Delete" field deletes the entry specified in the "Calling From" field.

When "PROMPT ME" is selected from the "Calling From" field, and one of the Connect buttons (labelled "Send and Receive", "Send" and "Receive") is pressed, the "PROMPT ME" dialog box (not shown) is displayed. The "PROMPT ME" dialog box displays the "Calling From" settings from the last session during which "PROMPT ME" is invoked. The user can then edit the "Calling from" information displayed in the "PROMPT ME" dialog box.

Figure 20:
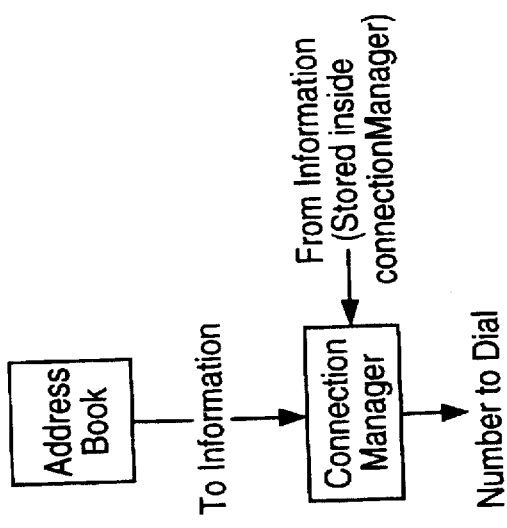
FIG. 20A shows a window of the File manager displaying the file systems of two computers, in accordance with the present invention.
FIG. 20B shows the window of FIG. 21a, after subdirectories are selected in each of panels 2102a and 2102b.

The present embodiment separates the "From" and "To" information by placing all the "To" (i.e. address-specific) information in the CAB, and stores the "From" information in the Connection Manager component. FIG. 20 summarizes the portions of the dialing information provided by the CAB and the Connection Manager components in forming a telephone number to be dialed.

5. File Synchronization

The File Manager component provides novel ways of addressing file management issues which face users of multiple computer systems. Some issues which face a user of multiple computers include: (a) how to send and retrieve individual files between two systems in the most efficient and economical manner; (b) how to maintain synchronization between files existing simultaneously in multiple computer systems; and (c) how to perform file transfers without requiring the two computer systems to be connected.

To synchronize files on two machines, the ICU's File Manager component performs deferred file transfers. In a deferred file transfer, requested file transfer are noted and queued when the source and destination machines are not connected. The actual file transfers occur when the two machines are physically connected. A window of the File Manager, shown in FIG. 20A, shows the file systems of two machines at a time. As shown in FIG. 20A, "computer" fields 2101a and 2101b display the names of the file systems of the local and remote computers. The name of the local computer's file system is shown in computer field 2101a, and the name of the remote computer's file system is shown in field 2101b. "Computer" field 2101b, which can be edited, is implemented as a combo box which allows the user to select from a list of file systems of remote computer to be displayed in panel 2102b. In each panel, such as panel 2102a, there is a scrollable region, e.g. 2103a, which displays the name of a file location on the panel's machine. One example of such file location is the machine's root directory. Below the scrollable region is shown a "view", e.g. view 2104a, which displays the contents of the specified file location. As discussed below, files on the two machines displayed on panels 2102a and 2102b can be marked for synchronization. The files so marked are indicated, in views 2104a and 2104b, by an icon next to their names.

The items listed in views 2104a and 2104b can be selected. If the selected item is a directory, the name of the selected directory is displayed in the respective scrollable regions 2103a or 2103b, and the contents of the selected directory are displayed in the respective views 2103a or 2103b. FIG. 20B shows panels 2102a and 2102b after subdirectories are selected in each of these panels. Once a subdirectory is entered, the area 2105a or 2105b displays status information of the sub-directory. Such status information includes: (i) when viewing a disk, total disk space and available disk space; (ii) when a file or a directory is slected, the size of the selected file or directory, and (iii) when the computers shown in panels 2102a and 2102b have a present physical connection ("live connection"), the elapsed connection time. When a live connection is established with a remote machine, the list of files on the remote machine are shown in the same manner as those on the current machine. However, when viewing files on a machine which is not currently connected to the remote machine, the files on the remote machine are grayed to indicate the files on the remote machine have not been updated.

Files in a file system are often provided a security rating, such that certain rights, such as the right to modify the files, are granted only to authorized users. For example, a common security level restricts "guest access" (i.e. not the owner of the file) to "Read Only", and thus prevents a guest from modifying a file. Other rights include "private", which prevents a guest from viewing a file, and "public", which grants the guest the right to modify the file.

Clicking on an entry in view 2104a or view 2104b (a file or directory) selects the entry, and at the same time deselects a previously selected entry in the same panel. In the present embodiment, disjoint selection is supported in one panel. Entries in a view can be dragged to the opposite panel and dropped to initiate or queue a file or directory for copy. Selecting a file or directory that is marked for synchronization with another causes the corresponding file or directory to appear in the opposite panel.

A button 2107a and a corresponding button 2107b are provided in panels 2102a and 2102b. When selected, button 2101a or 2101b displays a "pop-up" box, such as pop-up box 2110 shown in FIG. 20B. As shown in FIG. 20A, scrollable region 2102b displays, as the name of the current directory, a directory "C:\". If the current directory is a sub-directory, upon clicking on the button 2107b, a pop-up box 2110 is displayed (FIG. 20B), showing the names of the directories in the path from the root directory to current directory. In FIG. 20B, the current directory is "CLIPART", which has a path of "C:\WINWORD\CLIPART". Thus, the names "C:", "WINWORD", and "CLIPART" are displayed in the manner shown in pop-up box 2110 to illustrate the directory hierarchy.

In general, subject to security restrictions, the File Manager operates on files, directories, or disks of a remote machine. When a present connection does not exist between the current machine and the remote machine, such operations are applied to the most recent snapshots of the remote machine (see below). An operation performed on the most recent snapshots of the remote machine is queued as a request to be transmitted when a physical connection is achieved. Of course, when a physical connection exists, a request by the File Manager on the remote machine is dispatched immediately. Files or directories moved or copied from a remote machine that is not currently connected live are grayed, to indicate the tentative nature of the deferred file operations. Grayed files or directories will not be available for any manipulation, except delete, until actual file transfers take place at the next connection. Deleting a grayed file will cancel a transfer.

The File Manager components provide the menus "File", "View", and "Help". Under the File Menu are the commands "Open", "Copy", "Properties", "Synchronize", "Unsynchronize", "Connect", "Disconnect", "Guess access" and "Exit".

The "Open" menu item is grayed unless a directory in a view is selected. Selecting a directory causes the contents of the directory to be displayed in the view, and the name of the directory entered in the scrollable region, such as region 2102a. When the selected directory is in a machine which is not live-connected, the information displayed in the view is derived from the most recent "snapshot" of the remote machine. If a present connection exists, the displayed information is the current state of the remote machine.

The "Copy" item is grayed unless a file name or directory in a view is selected. When "Copy" is selected after a file or directory is selected, the user is prompted for a target file or directory name. The selected file or directory is then transferred to the directory/disk shown in the opposite panel.

Figure 21A:
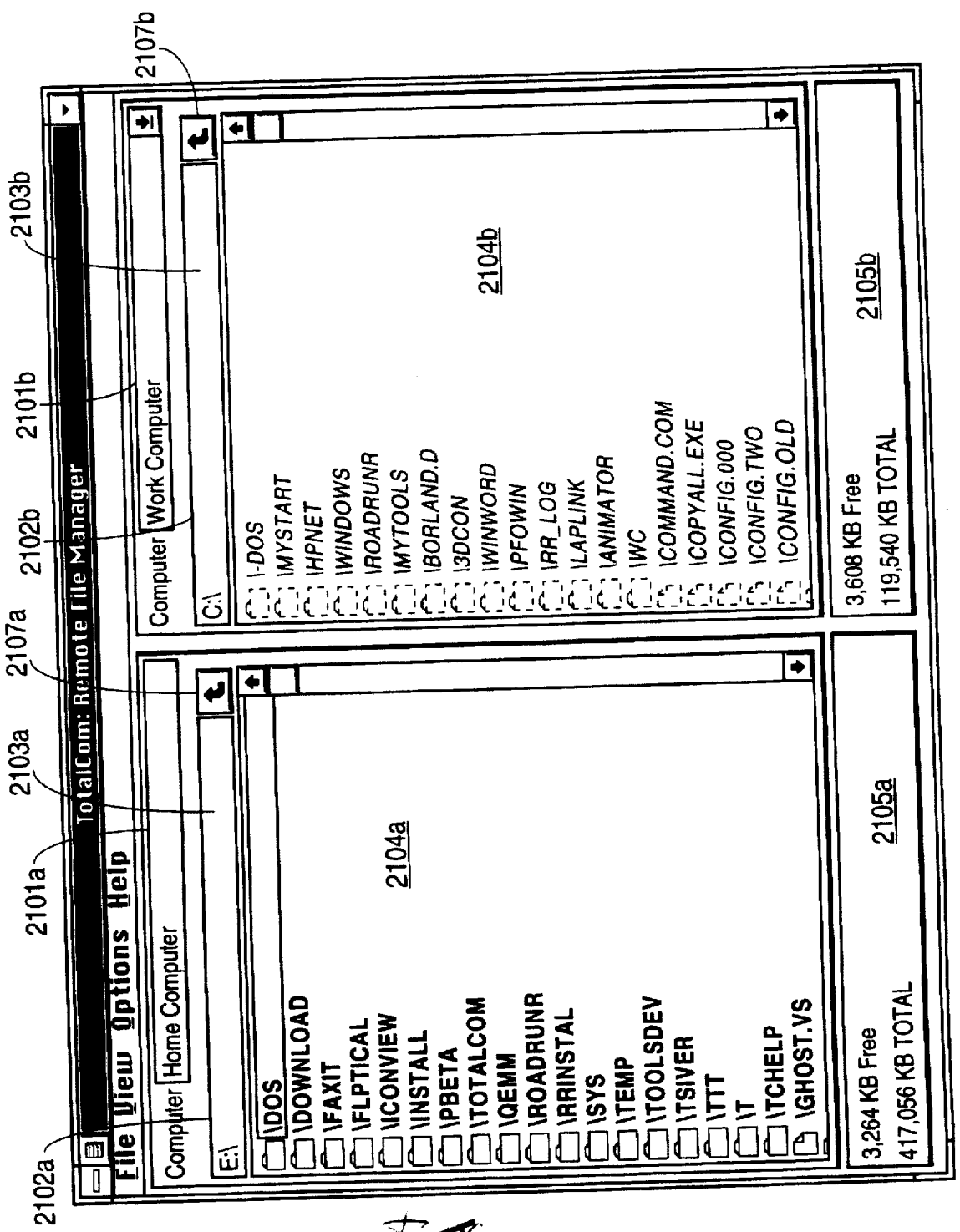
FIG. 21 shows a dialog box 2200 illustrative of the "Properties" item under the File Menu, in accordance with the present invention.
Figure 21B:
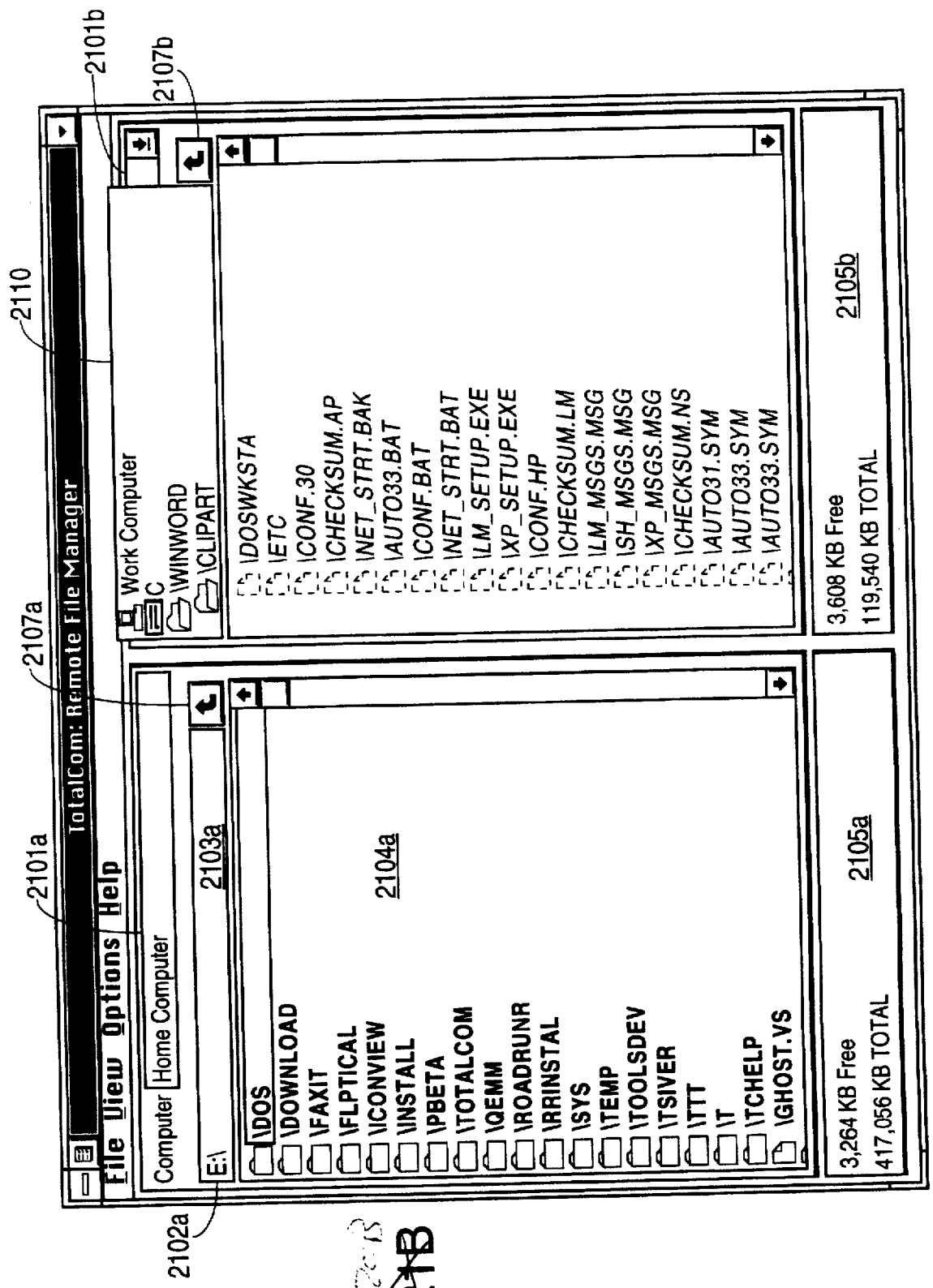

The "Properties" item is grayed unless a file name or directory is selected. When "Properties" is selected, a simple dialog box is displayed showing the file's or the directory's size, its time and date stamps, and the values of the flags associated with the selected file or directory. If the selection is a file or directory marked for synchronization, an estimate of whether or not the synchronization will actually take place (based on time and date of last modification in relation to the timestamp of the last snapshot). If the selected file is queue to be transferred, the name of the target machine is shown. Guest privileges on the file or directory are also shown. FIG. 21 is an example of a dialog box 2200 illustrative of the "Properties" item under the File Menu.

The "Synchronize" item is grayed unless a file or directory selected is not currently marked for synchronization. The "Synchronize" item is also grayed when both panels under the File Manager refer to the current machine. The selected file or directory is marked for synchronization with a file or directory of the same name in the opposite panel. If the corresponding file or directory does not exist in the opposite panel, the selected file or directory is transferred to the opposite panel and marked for synchronization.

The "Unsynchronize" item is grayed unless a file name or directory, which is marked for synchronization, is selected from a view. The "Unsynchronize" item unmarks the file or directory for synchronization.

The "Connect" item is a menu in itself. The "Connect" menu is grayed when both panels are displaying information of the same machine, or the machine is currently connected with another machine different from the one referenced in the File Manager's panels. When selected, in addition to a "PROMPT ME" item, the "Connect" menu is displayed showing all the 'From' locations defined in the Connection Manager (CM).

When a 'From' item is selected from the "Connect" menu, the information on that 'From' location is combined with the dialing information on the Computer type address card corresponding to the remote machine specified in the "Computer" field. When a connection is established, all queue File Manager transaction would occur.

The "Prompt Me" menu item prompts the user for the dialing information.

The "Disconnect" item is grayed unless a present connection exists. When "Disconnect" is selected, the user is prompted for a confirmation, before the modem closes the connection between the computers. A connection between two computers can also be closed by the user selecting a different machine in the "Computer" field.

The "Guest Access" item is grayed when there is not a present connection, or when the live connection is established using a "Guest" password. "Guest Access" is also ungrayed when the selected file or directory is on the current machine. When selected, the user is prompted for the level of access granted on the selected file or directory to a guest user. The default guest access is "Read Only". Several Guest access rights are available, with "Private" being the highest priority and "Public" being the lowest. If a directory is marked public, but some files within the directory are marked private, then a guest can access all files in the directory except the private ones. If a directory is marked private, even though some files in the directory are marked public, a guest would still not be able to access any files in that directory.

The "Request Snapshot" item is normally grayed if a snapshot exists for the machine, the drive or the directory selected. When a connection between the local machine and the remote machine exists, "Request Snapshot" creates and adds to the current snapshots a snapshot of the desired area.

The "Exit" item, also invoked by a double-click on the system menu, closes the File Manager.

Under the "View" Menu are the following selections: "View Sync List", "View Name", "View All", "View Part", "Sort by Name", "Sort by Type", "Sort by Size" and "Sort by Date."

Figure 22:
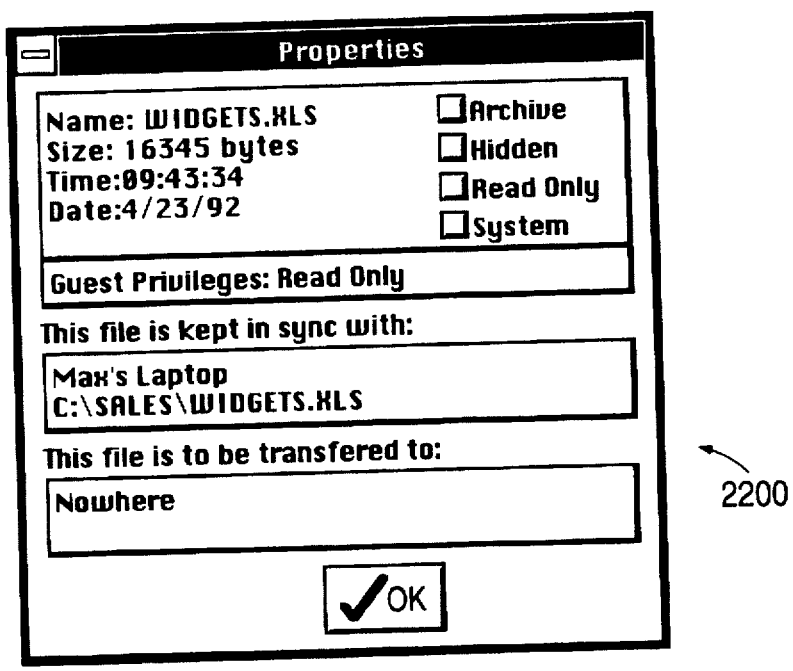
FIG. 22 shows a dialog box 2300 showing the "Confirm" Menu under the "Options" Menu of the File Manager of the present invention.
Figure 22:
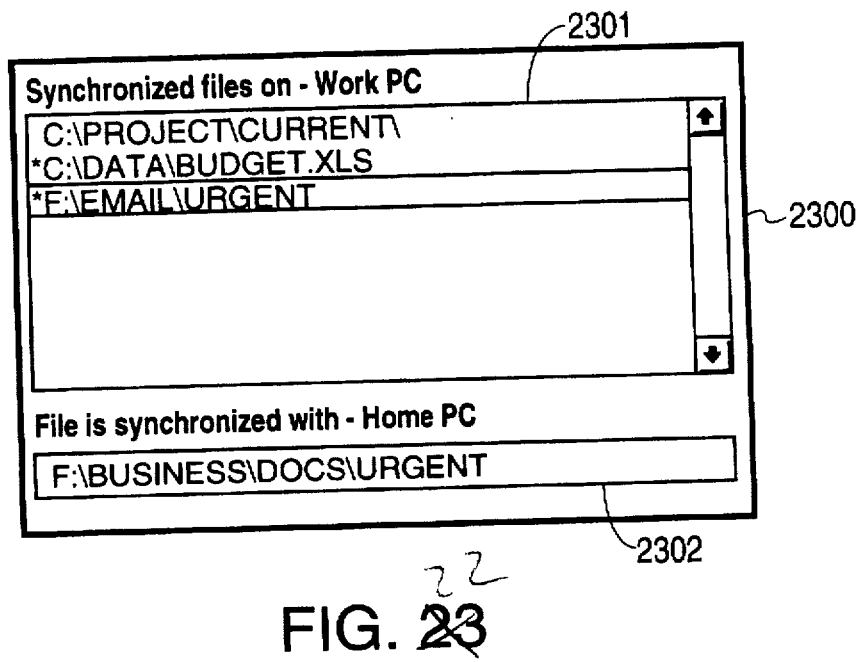
Figure 24A:
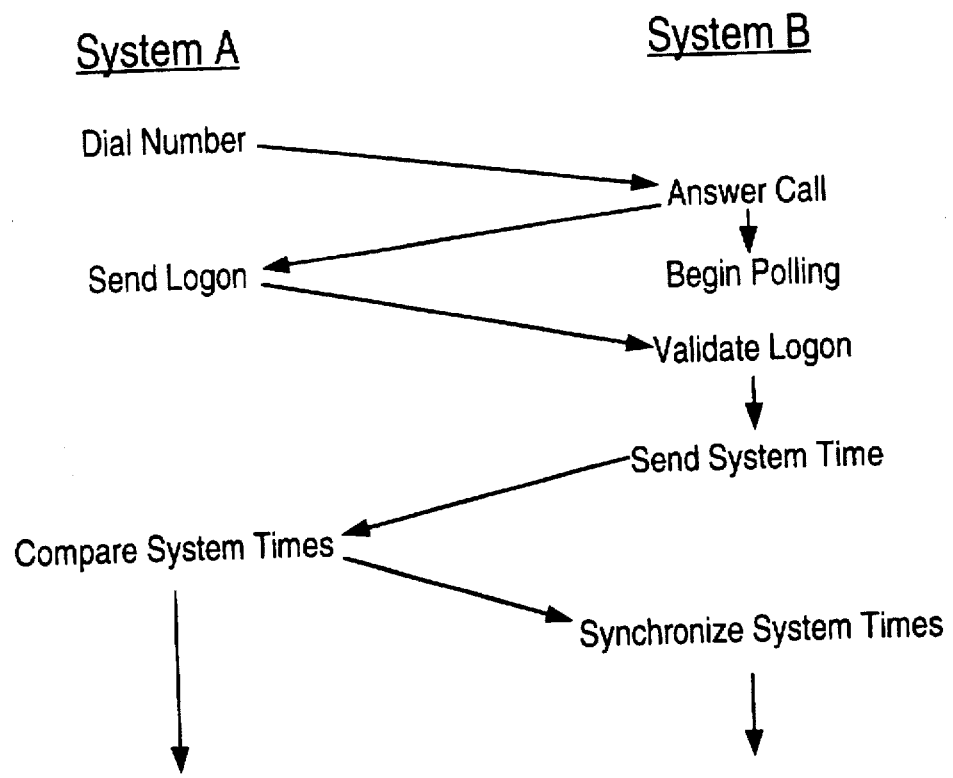
Figure 24B:
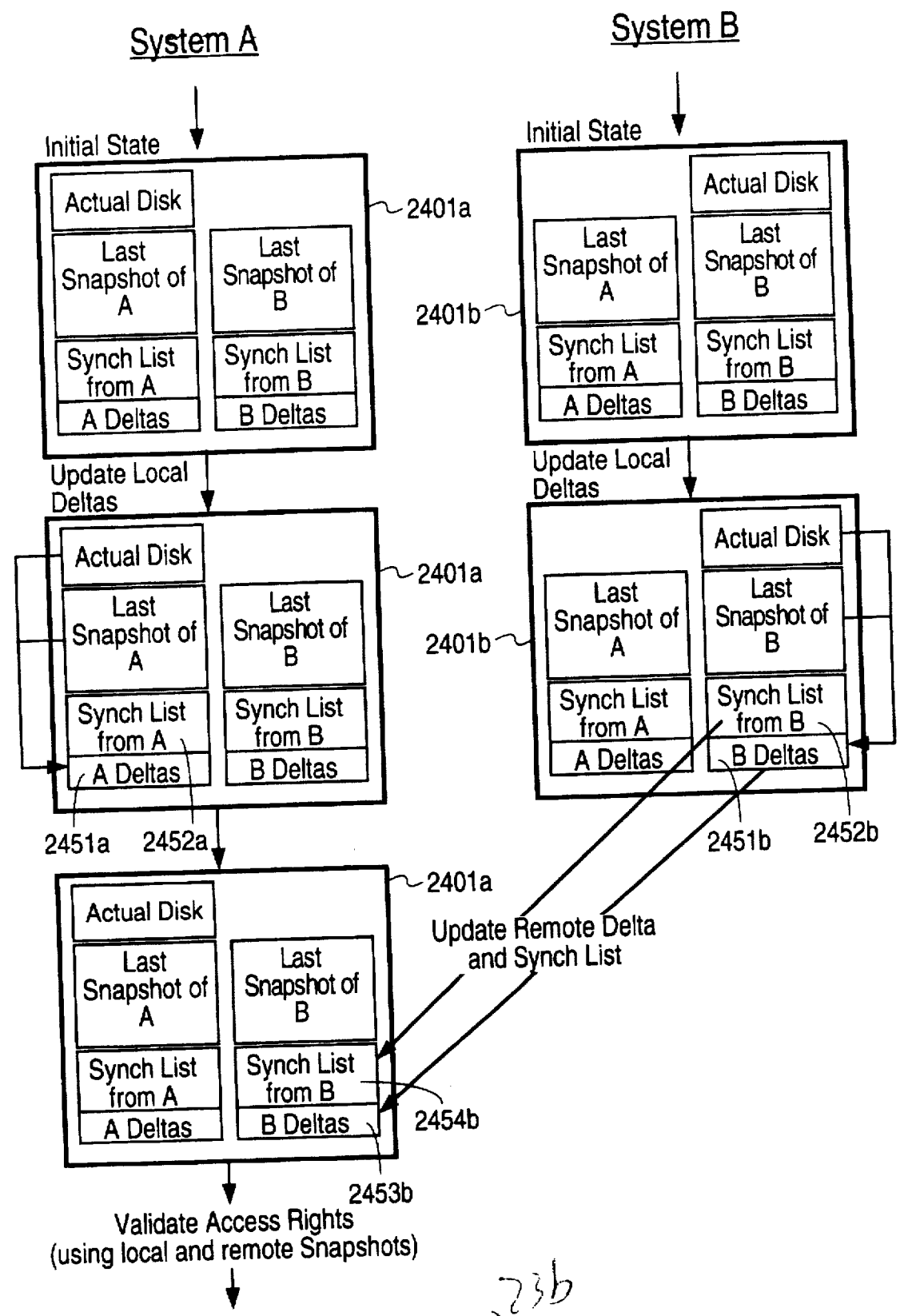
Figure 24C:
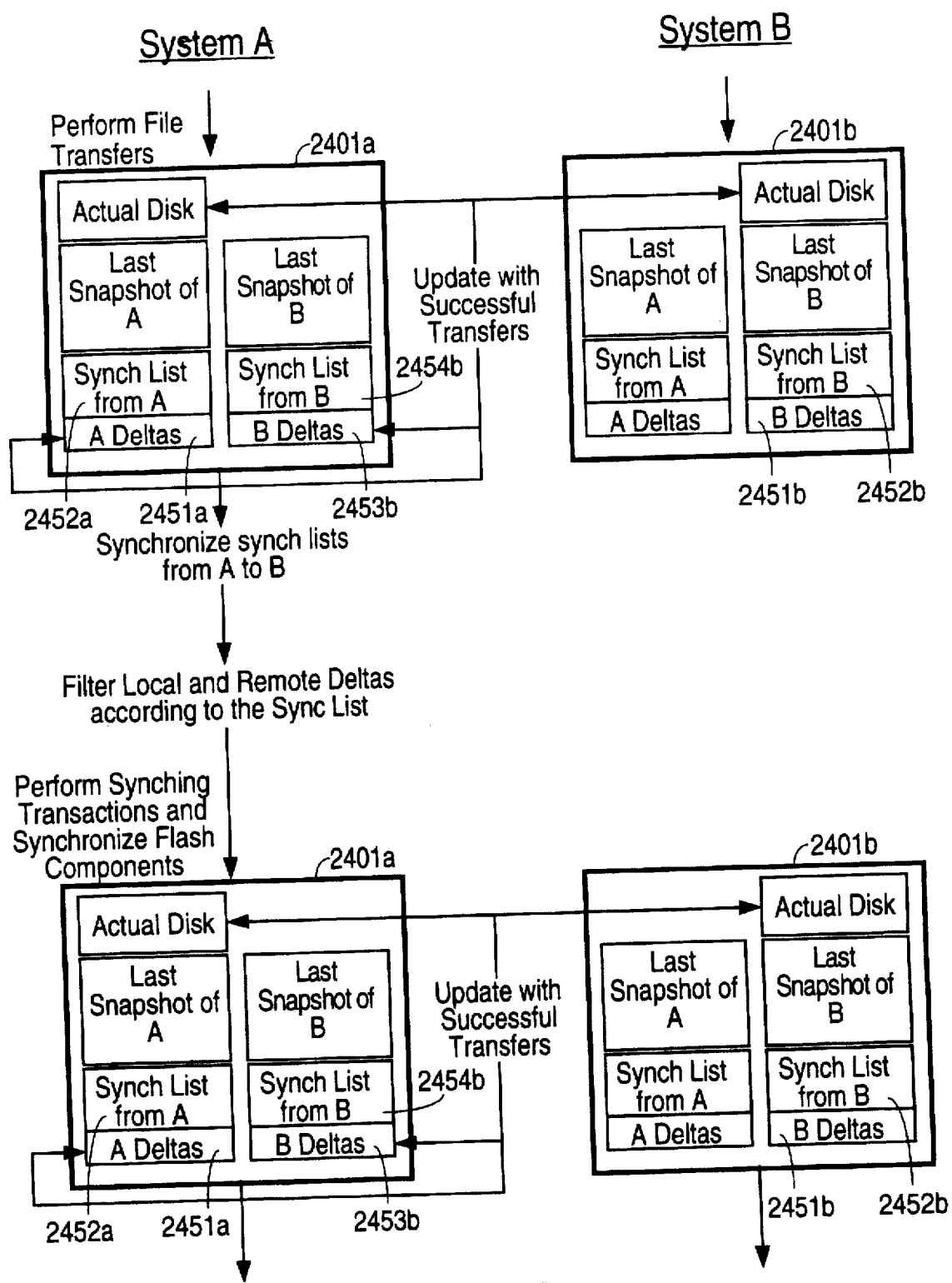
Figure 24D:
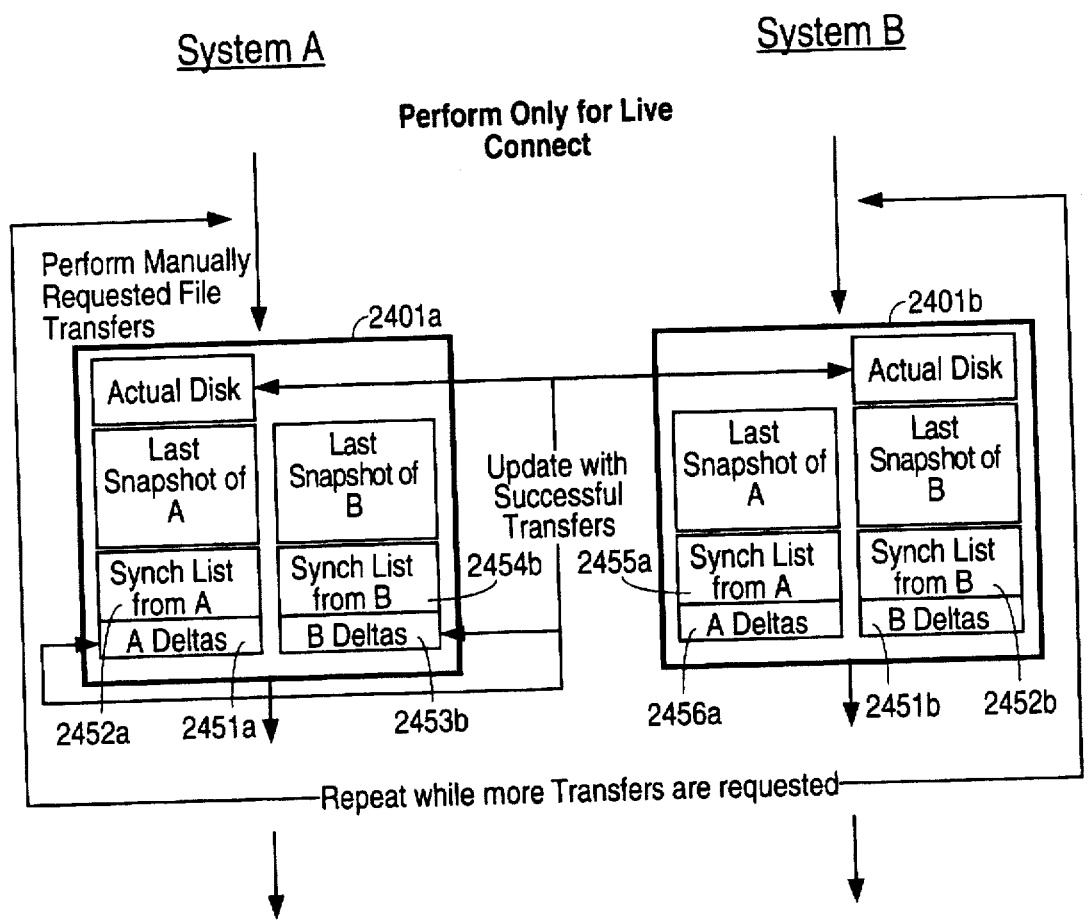
Figure 24E:
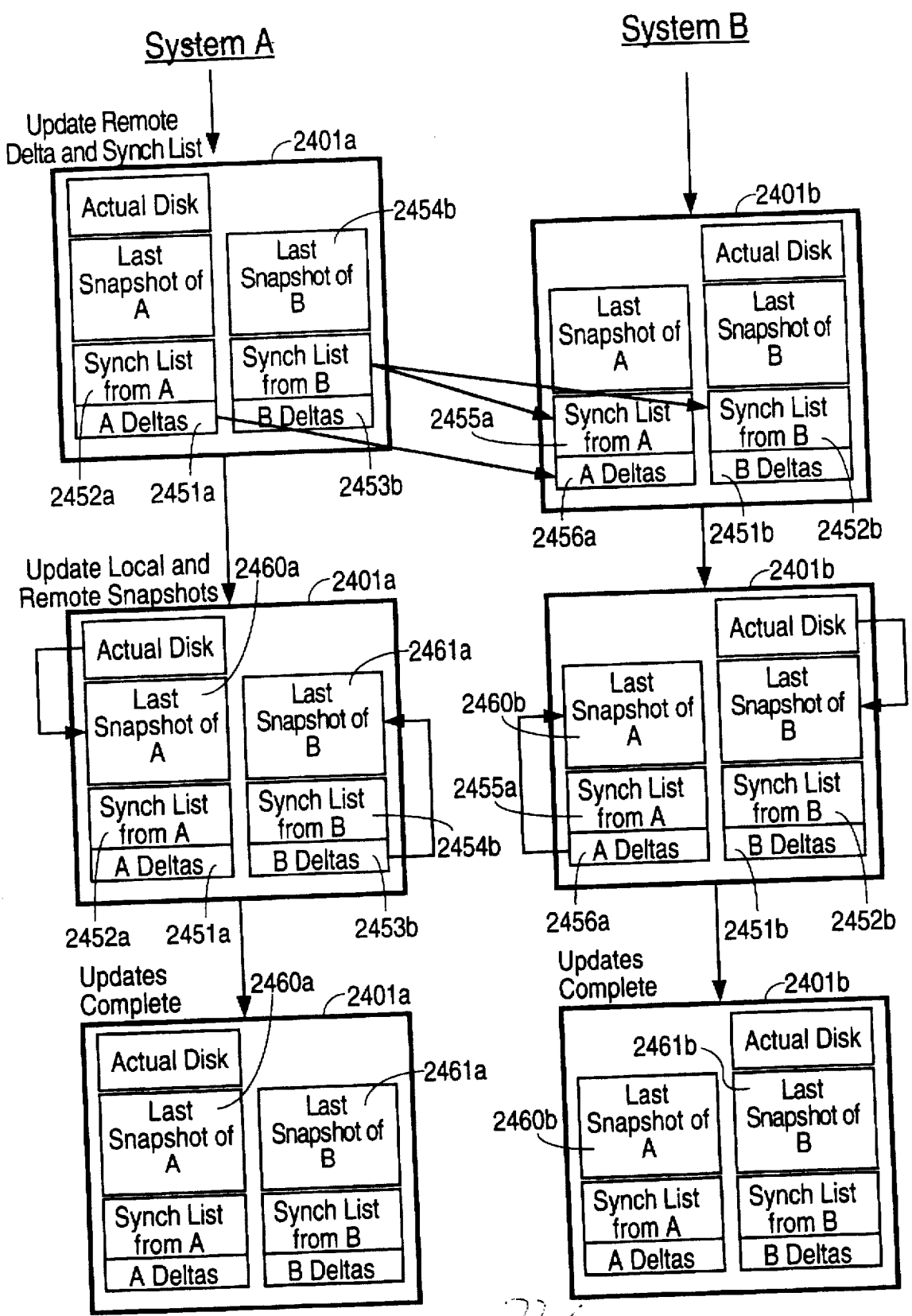

The "View Sync list" item displays the "Sync List" dialog box 2300 shown in FIG. 22. Dialog box 2300 shows all the files on the current or local machine ("Work PC" in dialog box 2300) that are being kept in synchronization with files on a remote machine ("Home PC" in dialog box 2300). Dialog box 2300 can be used to cancel any synchronization settings, but otherwise read-only. A list of files on the local machine which are to be synchronized with files on the remote machine are shown in list box 2301. One file in the list of listbox 2301 can be selected. The file in the remote machine corresponding to the selected file of listbox 2301 is shown in box 2302.

The "View Name", "View All" and "View Part" items are mutually exclusive alternative selections. "View Name"

displays in each panel only the names and icons of the files, directories or disks displayed. "View All" displays in each panel the icon, name, size, time and date of the files or directories displayed. "View Part" prompts a user to choose from "Name", "Size", "Time" and "Date" the fields to display.

The "Sort By Name", "Sort by Type", "Sort by Size" and "Sort By Date" items, which are mutually exclusive selections, select the order in which the selected files and directories are sorted.

In the present embodiment, a snapshot is an inventory of a disk at a given point in time on a remote machine. The snapshot captures the names of files and directories, tags, times, dates, sizes, and synchronization settings. Snapshots are made or updated whenever a connection is established under ICU control. Snapshots are created by the ICU to provide file or directory information on a remote machine, when a present connection is not available.

When a file or a directory is marked for synchronization with another file or directory, synchronization replaces the relatively older version of the file or directory by the more recent one. The current implementation allows synchronization of files between two machines. It is, of course, possible for to mark a file for synchronization with files on more than one other machine. However, synchronization updates for the present embodiment occur only on two machines at a time. The ICU keeps tracks of the time zone in which a file or directory is created, so that, in order to prevent a later version of a file from being replaced by an earlier version in the synchronization process, synchronization occurs only after compensation for time differences.

A live connection is made whenever two machines each running an instance of the ICU are either directly connected via a serial or parallel cable, or by modems through the Connect Manager. A live connection is indicated in the File Manager by an altered PC icon next to the "Computer" field of the remote machine's panel. When a currently connected remote machine is selected, the whole directory structure is available to the local machine and all operations performed in the File Manager occur immediately. Modem connected machines are disconnected when the user selects the Disconnect menu item. A live connection to a host computer allows the drives on the host computer to be mapped into the local machine and made accessible by the File Manager. The File Manager maps the remote machine's drives mapped to unused drives on the local machine. When live connected, and the user performs an action such as Move or Copy that may take more then a second, a small dialog box is displayed to give the user feedback on time remaining and allow interruption or canceling of the operation.

When a modem connection is made to a host computer running an instance of an ICU, the passwords provided on the calling computer's Computer type address card are used to validate the connection. A guest and an owner are usually given different privileges. When connected as a guest, only files and directories that have not been marked private can be viewed by the guest's File Manager. Files marked "Read Only" are not modifiable by a guest.

The File Manager is implemented by three basic types of synchronization files. The three types are "Snapshot", "Synch Master", and "Delta Master" files.

A "Snapshot file" contains a full image all file directories, on all disk volumes, of a particular computer. The image includes all attributes of the files and directories on that computer. The attributes includes date and time of last modification, size and access protection. In addition, the image contains all of the relationships between files and directories (e.g. the parentage).

A "Synch Master file", which is included in each computer ("local") running an instance of the File Manager component, contains the records for all pending file transfers between the local computer and every computer with which the local computer communicates. In addition, the Synch Master file maintains a list of the files and directories that are to be synchronized between the local computer and every machine to which the local computer connects.

A "Delta Master" file contains a transaction list derived from comparing two snapshot files of the same computer. Essentially, a Delta Master file describes the operations needed to modify the earlier snapshot file to arrive at the later snapshot file. These operations are Add, Delete and Modify.

In the present embodiment, each computer ("local computer") maintains two sets of synchronization files for each computer ("remote computer") it communicates with. Each set of synchronization files include: (i) a snapshot file for each disk volume on the remote computer; and, (ii) created at the same time as (i), a snapshot file for each volume on the local computer.

Each set of synchronization files allow the local computer to display the file system of the remote computer even though a present connection does not exist with the remote computer. Additionally, the set of synchronization files allow the local computer to determine, since the last connection between the local computer and the remote computer, which files on the local computer have been changed, and hence require synchronization with the remote computer.

FIGS. 23A–23D show the sequence of events under the control of the File Manager during a connection between the local computer and a remote computer. This connection can be initiated in the File Manager window by selecting the "Connect" item in the File Menu, or when a connection occurs outside of the File Manager, such as when electronic mail is sent. As shown in FIG. 23A, the local computer "System A" calls a remote computer "System B". When System B answers, System A provides the "logon" information, which is validated by System B. System B then sends System A a current time stamp, which is used by System A to synchronize its clock. Clock synchronization eliminate any effects of time zone differences, or inaccurate clock settings.

FIG. 23B shows events subsequent to those shown in FIG. 23A. Boxes 2401a and 2401b shows the state of the synchronization files on System A and System B respectively immediately after the systems' clocks are synchronized. On each machine, both a snapshot file of System A and a snapshot file of System B, created at the end of the last connection, are stored. These snapshot files are referred to as "Last Snapshot of A" and "Last Snapshot of B" respectively. When a successful connection between System A and System B is established, each system compares the state of its own file system against the last snapshot file of itself. These operations in Systems A and B are shown in boxes 2401a and 2401b. The additions, deletions or modifications necessary to update the snapshot file to the current state of the disk volumes are provided in the "Delta Master" file of each system. In FIG. 23B the "Delta Master" files for System A and System B are respectively labelled "A Deltas" and "B Deltas" and generally indicated by reference numerals 2451a and 2451b. In addition, each system maintains a synchronization list, labelled "Synch List from A" and "Synch List from B" respectively, generally indicated by reference numerals 2452a and 2452b. These synchronization lists list the files and directories for which file synchronization is performed. Upon connection, Systems A and B each update the "Last Snapshot" of itself using respectively Delta master file 2451a and Delta master file 2451b.

System B's Delta Master file 2451b and synchronization list file 2452b are then transferred to System A to update System A's copy of "Delta Master" file and synchronization list file of system B, which are indicated by reference numerals 2453b and 2454b respectively. The next event, which is the transfer of the queued files, is shown in FIG. 23C. As file are transferred between System A and System B, Delta Master files 2451a and 2453b are updated to reflect successful file transfers.

In addition to Delta Master file, System B also sends System A a copy of its most recent Synch Master file. This synchronization file is referenced as Sychronization list file 2454b. After the file transfers are completed, System A "synchronizes" its Synch Master file, i.e. Synchronization list file 2452a, with the copy of System B's Synch Master file it receives, i.e. Synchronization list file 2454b, by comparing and updating Synchronization list file 2454b, to include in the Synchronization list file 2452a any additional files marked for synchronization, and to remove from Synchronization list file 2452a any references to files which is no longer marked for synchronization.

After synchronization of the Synch Master files is completed, the Delta Master files 2451a and 2453b are filtered to remove any transaction that is not required to perform file synchronization under the synchronized Synchronization list files 2452a and 2454b. Synchronization transactions are then performed by actually copying, modifying and deleting files in both System A and System B, and updating the Delta Master files 2451a and 2453b.

If the connection is initiated by selecting the "Connect" item in the File Menu, control is then transferred to the user interface to allow the user to enter commands manually to request file transfers. As each file is successfully transferred, Delta Master files 2451a and 2453b are updated. These operations are illustrated by FIG. 23D. The files to be transferred are indicated by the dragging and dropping operations between the displayed views discussed above.

The remaining sequence of events to complete file synchronization is shown in FIG. 23E. As shown in FIG. 23E, System A sends System B "Delta Master" file 2451a, so as to allow System B to update System B's snapshot files. In addition, System A also sends the updated Synchronization list file 2454b to inform System B of any changes in the synchronization list. Both System A and System B then apply, respectively, Delta Master files 2456a and 2453b to update snapshot files 2461a and 2460b each system maintains about the other system.

Finally, Systems A and B each update its "last snapshot" of itself, i.e. Snapshot files 2460a and 2461b respectively, to reflect the current states of themselves. The physical connection between Systems A and B can then be terminated to return to deferred file transfer mode.

The above detailed description is provided to illustrate the specific embodiments of the present invention and is not intended to be limiting of the present invention. Numerous modifications and variations within the scope of the present invention are possible. The invention is defined by the following claims.

We claim:

1. A method for efficiently sending a message to users of electronic mail and facsimile transmission, comprising the steps of:

providing, in a local computer system of an originator of said message, an integrated communication system having a control panel-based graphical user interface, said integrated communication system being capable of sending and receiving facsimile, transferring files, terminal emulation and electronic mail, said control panel-based graphical user interface capable of interfacing with an application program for creating said message and accessing a data base for storing information about a plurality of recipients;

providing in said data base, for each recipient, a recipient record for holding (i) a telephone number at which said recipient receives facsimile transmissions; (ii) an electronic mail address in a computer system at which said recipient receives electronic mail messages; and (iii) first and second data elements for indicating whether said recipient desires to receive said message in the form of an electronic mail and whether said recipient desires to receive said message in the form of a facsimile transmission, respectively;

preparing said message for sending to one or more of said recipients; and sending said message to said one or more of said recipients using a process of said local computer system, said local computer system sending said message to each recipient by electronic mail and by facsimile transmission in accordance with said first and second data elements.

2. A method for efficiently sending a message to users of electronic mail and facsimile transmission, comprising the steps of:

providing, in a local computer system, a data base for storing information about a plurality of recipients;

providing in said data base, for each recipient, a recipient record for holding (i) a telephone number at which said recipient receives facsimile transmissions; (ii) an electronic mail address in a computer system at which said recipient receives electronic mail messages; and (iii) first and second data elements for indicating whether said recipient desires to receive said message in the form of an electronic mail message and whether said recipient desires to receive said message in the form of a facsimile transmission, respectively;

providing in said data base, independent of said recipient records, a plurality of computer records for holding information about a plurality of computer systems, each computer record associated with one of said computer systems;

storing in each computer record: (i) a telephone number of a modem by which the computer system associated with said computer record, acting as a host computer, connects with other computer systems; and (ii) a protocol specification to be used when connecting to said computer system;

preparing a message for sending to one or more of said recipients;

sending said message to said one or more of said recipients using a process of said local computer system, said local computer system sending said message to each recipient by electronic mail and by facsimile transmission in accordance with said first and second data elements;

and, when said message is sent to a recipient by electronic mail, (i) determining, from the electronic mail address of said recipient, the recipient's computer system;

(ii) obtaining the computer record corresponding to said recipient's computer system; and (iii) establishing a connection between said local computer system and said recipient's computer system, using said telephone number and said protocol.

3. A method as in claim 1, further comprising the steps of:

providing in said data base, independent of said recipient records, a plurality of group records for holding information about said recipients and said plurality of group records; and storing in each group record: (i) a list of said recipient records; and (ii) a list of said group records;

listing in a group record said one or more recipients; and sending said message to said one or more recipients by providing said process with said group record listing said one or more recipients.

4. A method as in claim 1, further comprising the steps of:

providing in said data base, independent of said recipient records, a plurality of service records for holding protocol information about accessing each of said public electronic mail services; and generating electronic mail messages in accordance with said service records for transmitting over said public electronic mail services.

5. A system for efficiently sending a message to users of electronic mail and facsimile transmission, comprising:

a control panel-based graphical user interface, said control panel-based graphical user interface capable of interfacing with an application program for creating said message;

a data base in a local computer system of an originator of said message for storing information aboaut a plurality of recipients;

a recipient record in said data base, for each recipient, for holding (i) a telephone number at which said recipient receives facsimile transmissions; (ii) an electronic mail address in a computer system at which said recipient receives electronic mail messages; and (iii) and second data elements for indicating whether said recipient desires to receive said message in the form of electronic mail message and whether said recipient desires to receive said message in the form of a facsimile transmission, respectively; and means for sending said message to said one or more of said recipients using a process of said local computer system, said local computer system sending said message to each recipient by electronic mail and sending and receiving facsimile transmissions, transferring files, terminal emulation in accordance with said first and second data elements.

6. A system as in claim 5, further comprising:

a plurality of group records in said data base, independent of said recipient records, for holding information about said recipients and said plurality of group records; and means for storing in each group record: (i) a list of said recipient records; and (ii) a list of said group records;

means for listing in a group record said one or more recipients; and means for sending said message to said one or more recipients by providing said process with said group record listing said one or more recipients.

7. A system as in claim 5, further comprising:

a plurality of service records in said data base, independent of said recipient records, for holding protocol information about accessing each of said public electronic mail services; and means for generating electronic mail messages in accordance with said service records for transmitting over said public electronic mail services.

8. A system for efficiently sending a message to users of electronic mail and facsimile transmission, comprising:

a data base in a local computer system for storing information about a plurality of recipients;

a recipient record in said data base, for each recipient, for holding (i) a telephone number at which said recipient receives facsimile transmissions; (ii) an electronic mail address in a computer system at which said recipient receives electronic mail messages; and (iii) first and second data elements for indicating whether said recipient desires to receive said message in the form of an electronic mail message and whether said recipient desires to receive said message in the form of a facsimile transmission, respectively;

means for preparing a message for sending to one or more of said recipients;

means for sending said message to said one or more of said recipients using a process of said local computer system, said local computer system sending said message to each recipient by electronic mail and by facsimile transmission in accordance with said first and second data elements;

a plurality of computer records in said data base, independent of said recipient records, for holding information about a plurality of computer systems, each computer record associated with one of said computer systems;

means for storing in each computer record: (i) a telephone number of a modem by which the computer system associated with said computer record, acting as a host computer, connects with other computer systems; and (ii) a protocol specification to be used when connecting to said computer system;

means for determining the recipient's computer system from the electronic mail address of said recipient, when said message is sent to a recipient by electronic mail;

means for obtaining the computer record corresponding to said recipient's computer system; and means for establishing a connection between said local computer system and said recipient's computer system, using said telephone number and said protocol.

* * * * *